(12) United States Patent
Mizunuma et al.

(10) Patent No.: US 12,345,348 B2
(45) Date of Patent: Jul. 1, 2025

(54) VALVE DEVICE

(71) Applicant: DENSO CORPORATION, Kariya (JP)

(72) Inventors: Takehito Mizunuma, Kariya (JP); Ryo Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 18/469,218

(22) Filed: Sep. 18, 2023

(65) Prior Publication Data

US 2024/0003430 A1  Jan. 4, 2024

Related U.S. Application Data

(63) Continuation of application No. PCT/JP2022/015517, filed on Mar. 29, 2022.

(30) Foreign Application Priority Data

Apr. 21, 2021 (JP) ................. 2021-071787

(51) Int. Cl.
*F16K 3/06* (2006.01)
*F16K 31/04* (2006.01)

(52) U.S. Cl.
CPC ............... *F16K 3/06* (2013.01); *F16K 31/04* (2013.01)

(58) Field of Classification Search
CPC .............................. F16K 31/043; F16K 11/074
See application file for complete search history.

(56) References Cited

U.S. PATENT DOCUMENTS 8,074,678 B2 * 12/2011 Kee ........................ F16K 3/08
251/208

10,781,932 B2 * 9/2020 Yokoe ................. F16K 11/0743
11,156,306 B2 * 10/2021 Yokoe ................... F16K 31/043

FOREIGN PATENT DOCUMENTS

JP  2002257248 A1  9/2002

OTHER PUBLICATIONS

U.S. Appl. No. 18/190,514 to Ryo Sano, filed Mar. 27, 2023 (48 pages).
U.S. Appl. No. 18/190,565 to Takuya Hamada, filed Mar. 27, 2023 (50 pages).
U.S. Appl. No. 18/469,004 to Atsushi Tananka, filed Sep. 18, 2023 (63 pages).
U.S. Appl. No. 18/469,073 to Yoshitada Aono, filed Sep. 18, 2023 (63 pages).

(Continued)

*Primary Examiner* — Eric Keasel
(74) *Attorney, Agent, or Firm* — Nixon & Vanderhye P.C.

(57) ABSTRACT

In a valve device, a rotor includes a drive disk and a lever fixed to the drive disk. The lever couples between the drive disk and a shaft. In the valve device, a first torsion spring is placed between a housing and the shaft, and a second torsion spring is placed between the shaft and the lever. A drive device includes an electric motor configured to drive the shaft in a rotational drive range, which is between an initial rotational position and a maximum rotational position, in a first rotational direction toward the initial rotational position and a second rotational direction opposite to the first rotational direction. The first torsion spring urges the shaft relative to the housing in the second rotational direction in the state where the shaft is placed in the initial rotational position upon the rotation of the shaft in the first rotational direction.

5 Claims, 16 Drawing Sheets

(56) References Cited

OTHER PUBLICATIONS

U.S. Appl. No. 18/469,291 to Ryo Sano, filed Sep. 18, 2023 (54 pages).
U.S. Appl. No. 18/468,925 to Shota Kimura, filed Sep. 18, 2023 (59 pages).
U.S. Appl. No. 18/469,283 to Naoki Asano, filed Sep. 18, 2023 (50 pages).
U.S. Appl. No. 18/468,972 to Takuya Hamada, filed Sep. 18, 2023 (53 pages).

* cited by examiner

VALVE DEVICE

CROSS REFERENCE TO RELATED APPLICATIONS

This application is a continuation application of International Patent Application No. PCT/JP2022/015517 filed on Mar. 29, 2022, which designated the U.S. and claims the benefit of priority from Japanese Patent Application No. 2021-071787 filed on Apr. 21, 2021. The entire disclosures of all of the above applications are incorporated herein by reference.

TECHNICAL FIELD

The present disclosure relates to a valve device.

BACKGROUND

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a disk (serving as a rotor) and a shaft. The disk and the shaft are configured to rotate integrally in a state where the disk is displaceable in an axial direction of the shaft.

In the flow rate control valve described above, when the disk, which is the rotor, is rotated by the drive device, an opening degree of a flow passage hole, through which the fluid flows from an inlet to an outlet of a housing, is increased or decreased.

SUMMARY

This section provides a general summary of the disclosure, and is not a comprehensive disclosure of its full scope or all of its features.

According to the present disclosure, there is provided a valve device that includes a housing, a stationary disk, a drive device, a shaft and a rotor. The housing forms a fluid passage to conduct a fluid through the fluid passage. The stationary disk is fixed at the inside of the housing and has at least one flow passage hole. The drive device is configured to output a rotational force. The shaft is configured to be rotated about a central axis by the rotational force. The rotor is configured to increase or decrease an opening degree of the at least one flow passage hole in response to rotation of the shaft. The rotor includes a drive disk and a lever. The drive disk is configured to slide relative to the stationary disk. The lever is fixed to the drive disk and couples between the drive disk and the shaft to enable integral rotation of the drive disk and the shaft. A first torsion spring is placed between the housing and the shaft and is configured to urge the shaft relative to the housing in a circumferential direction around the central axis of the shaft. A second torsion spring is placed between the shaft and the lever and is configured to urge the lever relative to the shaft in the circumferential direction. The drive device includes an electric motor that is configured to drive the shaft in a rotational drive range, which is between an initial rotational position and a maximum rotational position, in a first rotational direction toward the initial rotational position and a second rotational direction opposite to the first rotational direction. In a state where the shaft is in the initial rotational position after the shaft is driven by the electric motor in the first rotational direction, the first torsion spring urges the shaft relative to the housing in the second rotational direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
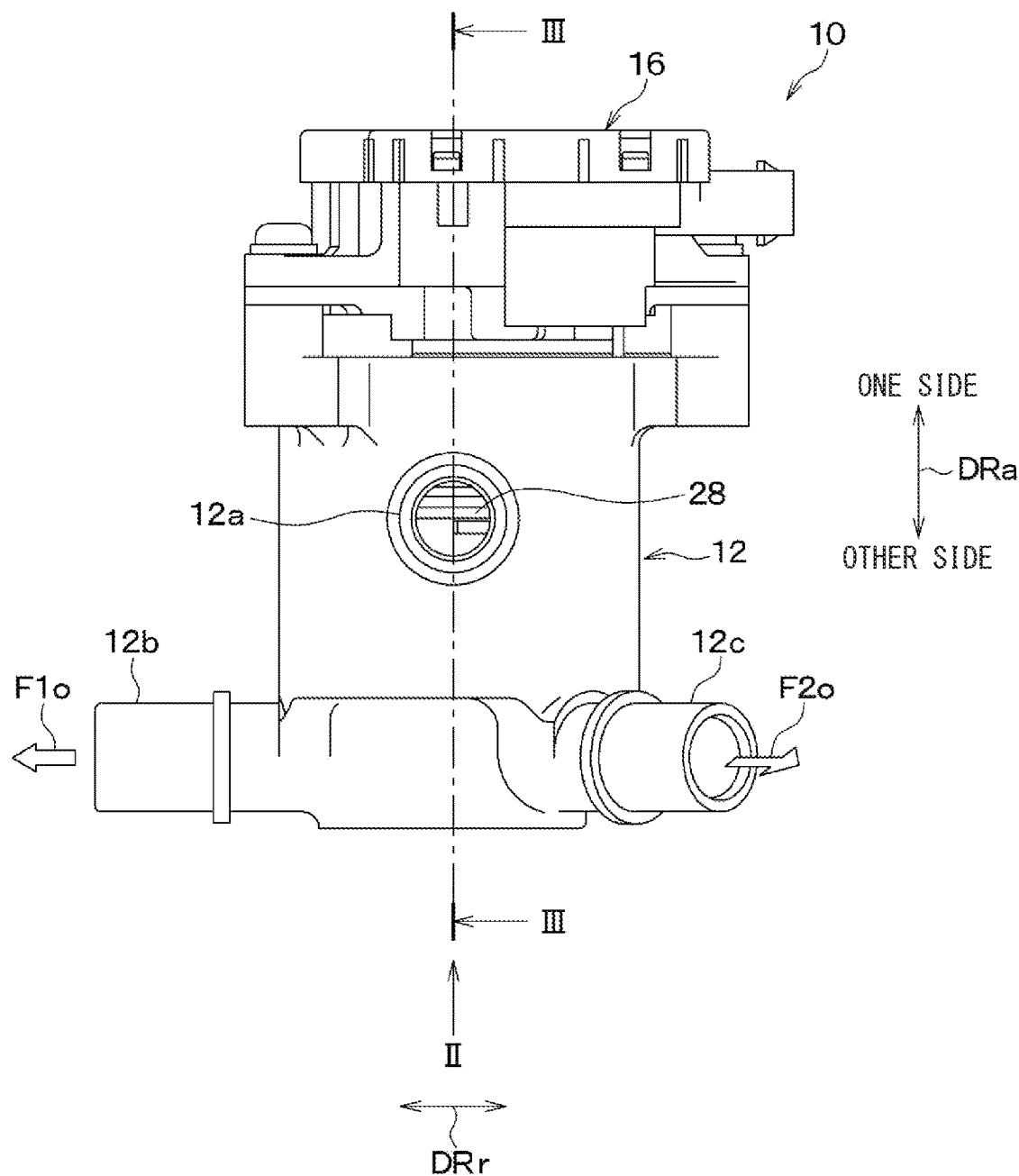
FIG. 1 is a front view of a valve device according to an embodiment.

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a disk (serving as a rotor) and a shaft. The disk and the shaft are configured to rotate integrally in a state where the disk is displaceable in an axial direction of the shaft.

In the flow rate control valve described above, when the disk, which is the rotor, is rotated by the drive device, an opening degree of a flow passage hole, through which the fluid flows from an inlet to an outlet of a housing, is increased or decreased.

However, in the flow rate control valve described above, no countermeasures are taken to limit rattling in the circumferential direction between the disk (serving as the rotor) and the shaft, so that variations occur in the opening degree of the flow passage hole. The variations in the opening degree of the flow passage hole will cause variations in the flow rate of the fluid, which flows through the valve device, so that the variations in the opening degree of the flow passage hole are not desirable. The above finding is made through the diligent study of the inventors of the present application.

According to one aspect of the present disclosure, there is provided a valve device including:
- a housing that forms a fluid passage at an inside of the housing, wherein the fluid passage is configured to conduct a fluid through the fluid passage;
- a stationary disk that is shaped in a plate form and is fixed at the inside of the housing, wherein the stationary disk has at least one flow passage hole which is configured to conduct the fluid through the at least one flow passage hole;
- a drive device that is configured to output a rotational force;
- a shaft that is configured to be rotated about a central axis, which is predetermined, by the rotational force; and
- a rotor that is configured to increase or decrease an opening degree of the at least one flow passage hole in response to rotation of the shaft, wherein:
  the rotor includes:
  - a drive disk that is shaped in a plate form and is configured to slide relative to the stationary disk in a state where the drive disk is opposed to the stationary disk; and
  - a lever that is fixed to the drive disk and couples between the drive disk and the shaft to enable integral rotation of the drive disk and the shaft in a state where the drive disk is displaceable in an axial direction of the shaft;
- a first torsion spring is placed between the housing and the shaft and is configured to urge the shaft relative to the housing in a circumferential direction around the central axis of the shaft;
- a second torsion spring is placed between the shaft and the lever and is configured to urge the lever relative to the shaft in the circumferential direction;
- the drive device includes an electric motor that is configured to drive the shaft in a rotational drive range, which is between an initial rotational position and a maximum rotational position, in a first rotational direction toward the initial rotational position and a second rotational direction opposite to the first rotational direction; and
- in a state where the shaft is in the initial rotational position after the shaft is driven by the electric motor in the first rotational direction, the first torsion spring urges the shaft relative to the housing in the second rotational direction.

Therefore, as long as the first torsion spring urges the shaft relative to the housing in the circumferential direction, the rattling in the circumferential direction between the drive device and the shaft is limited. In addition, as long as the second torsion spring urges the lever relative to the shaft in the circumferential direction, the rattling in the circumferential direction between the shaft and the lever is limited. Since the lever is fixed to the drive disk, the second torsion spring limits the rattling in the circumferential direction between the shaft and the drive disk.

Therefore, the rattling in the circumferential direction in the transmission path from the drive device to the rotor can be limited, and thereby the variations in the opening degrees of the flow passage holes caused by the rattling can be limited. Particularly, when the shaft in the initial rotational position is urged relative to the housing in the second rotational direction, it is possible to carry out highly accurate position control of the shaft (i.e., opening degree control of the passage hole) while using the initial rotational position as a start point of this position control of the shaft.

Hereinafter, an embodiment of the present disclosure will be described with reference to FIGS. 1 to 23. In the present embodiment, there will be described an example where a valve device 10 of the present disclosure is applied to a temperature adjusting device that is for air conditioning of a vehicle cabin and also for temperature adjustment of a battery at an electric vehicle. The valve device 10, which is used in the temperature adjusting device of the electric vehicle, is required to execute fine adjustment of the temperature according to a state of the vehicle cabin and a state of the battery and is required to more accurately adjust a flow rate of a fluid in comparison to a coolant circuit of an internal combustion engine.

The valve device 10 shown in FIG. 1 is applied to a fluid circuit in which the fluid (in this example, coolant) for adjusting the temperature of the vehicle cabin and the temperature of the battery is circulated. The valve device 10 can increase or decrease the flow rate of the fluid in a flow path through the valve device 10 in the fluid circuit, and the valve device 10 can also shut off the flow of the fluid in the flow path. For example, LLC, which contains ethylene glycol, is used as the fluid. Here, LLC stands for Long Life Coolant.

Figure 2:
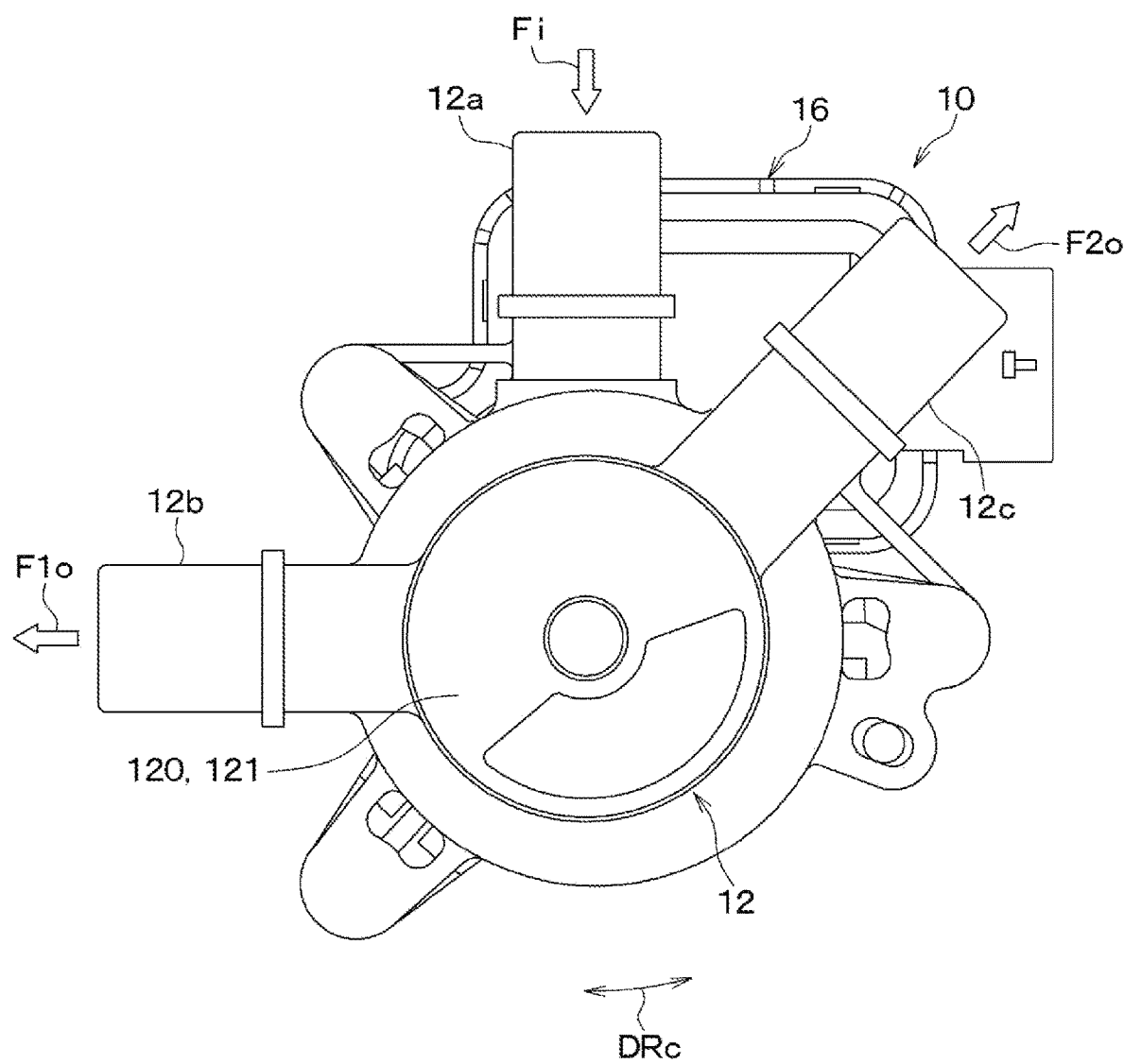
FIG. 2 is a bottom view of the valve device viewed in a direction of an arrow II in FIG. 1.

As shown in FIGS. 1 and 2, the valve device 10 includes a housing 12 that forms a fluid passage at an inside of the housing 12 to conduct the fluid therethrough. The valve device 10 is a three-way valve and is formed such that an inlet 12*a* for receiving the fluid, a first outlet 12*b* for outputting the fluid, and a second outlet 12*c* for outputting the fluid are formed at the housing 12. The valve device 10 functions not only as a flow path switching valve but also functions as a flow rate adjusting valve that adjusts a flow rate ratio between a flow rate of the fluid, which flows from the inlet 12*a* to the first outlet 12*b*, and a flow rate of the fluid, which flows from the inlet 12*a* to the second outlet 12*c*.

The valve device 10 is a disk valve that performs a valve opening/closing operation by rotating a valve element shaped in a circular disk form about a central axis CL of a shaft 18 described later. In the present embodiment, description of various structures will be made while assuming that a direction, which is along the central axis CL of the shaft 18 described later, is an axial direction DRa, and a radial direction of the central axis CL, which is perpendicular to the axial direction DRa, is a radial direction DRr. Also, in the present embodiment, the description of the various structures will be made while assuming that a circumferential direction around the central axis CL is a circumferential direction DRc.

Figure 3:
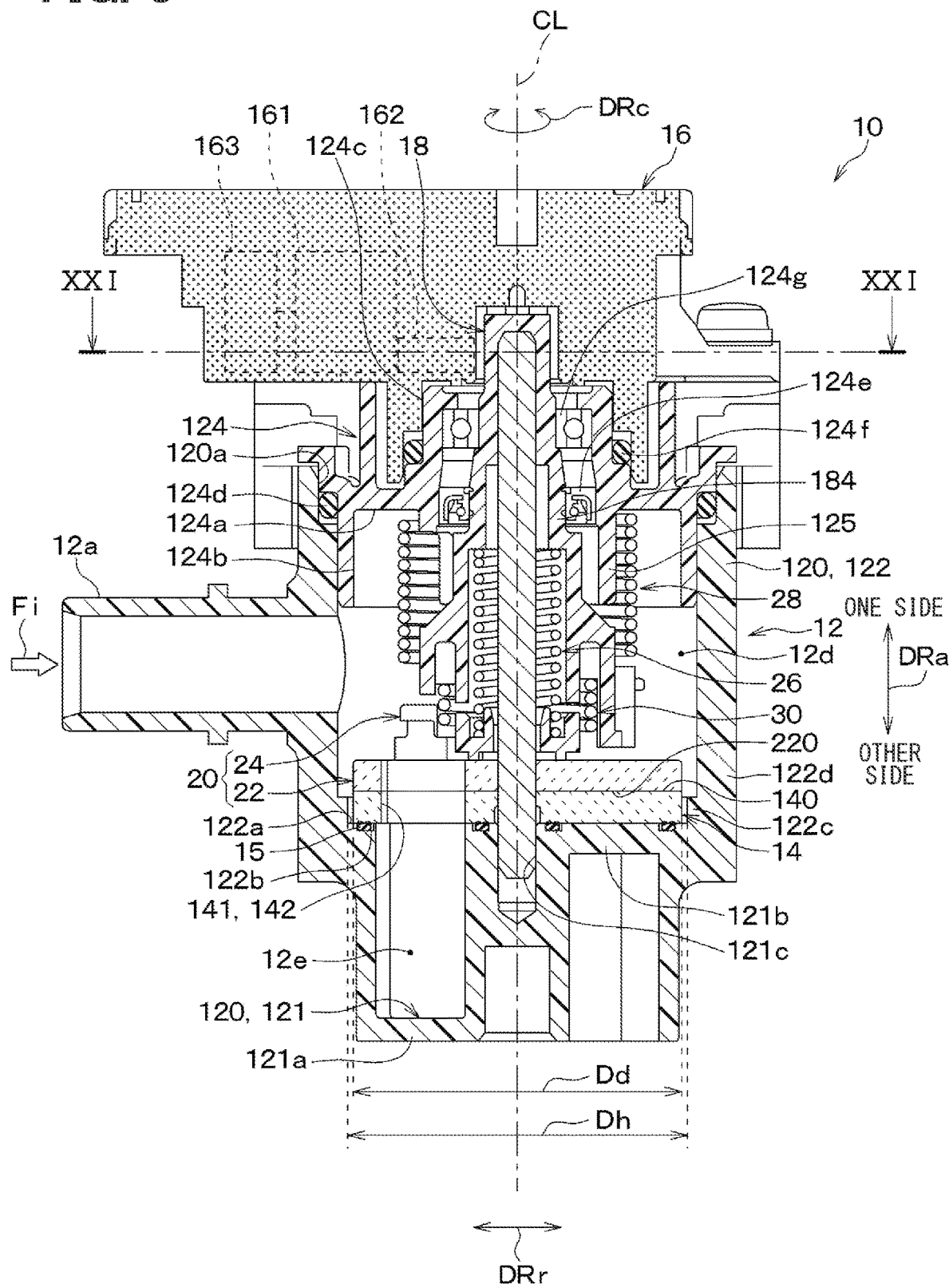
FIG. 3 is a cross-sectional view taken along line III-Ill in FIG. 1.

As shown in FIG. 3, in the valve device 10, a stationary disk 14, a drive device 16, the shaft 18, a rotor 20, a compression spring 26, a first torsion spring 28 and a second torsion spring 30 are received at the inside of the housing 12. Furthermore, in the valve device 10, the drive device 16 is placed at an outside of the housing 12.

The housing 12 is a non-rotatable member that does not rotate. The housing 12 is made of, for example, a resin material. The housing 12 has: a main body 120, which is shaped in a bottomed tubular form and extends in the axial direction DRa; and a main-body cover 124 which closes an opening 120a of the main body 120.

The main body 120 has: a bottom wall 121 which forms a bottom surface; and a peripheral wall 122, which circumferentially surrounds the central axis CL. The bottom wall 121 and the peripheral wall 122 are formed integrally in one-piece as an integral molded product.

Two stepped portions (recesses), which correspond to two passage holes 141, 142, respectively, of the stationary disk 14 described later, are formed at the bottom wall 121. That is, each of two portions of the bottom wall 121, which are opposed to the passage holes 141, 142, respectively, of the stationary disk 14, is further spaced from the main-body cover 124 than a portion of the bottom wall 121, which is not opposed to the passage holes 141, 142 of the stationary disk 14.

The bottom wall 121 has: two opposing portions 121a, which are opposed to the passage holes 141, 142, respectively, of the stationary disk 14; and a non-opposing portion 121b, which is not opposed to each of the passage holes 141, 142 of the stationary disk 14. The opposing portions 121a of the bottom wall 121 are largely spaced from the stationary disk 14, and the non-opposing portion 121b of the bottom wall 121 is adjacent to the stationary disk 14.

The peripheral wall 122 has the inlet 12a at a location that is closer to the opening 120a than to the bottom wall 121. The peripheral wall 122 also has the first outlet 12b and the second outlet 12c at a location that is closer to the bottom wall 121 than to the opening 120a. Each of the inlet 12a, the first outlet 12b and the second outlet 12c is a tubular member that has a flow passage therein.

A mounting portion 122a, on which the stationary disk 14 is placed, is formed at the inside of the peripheral wall 122 at a location between the portion of the peripheral wall 122, at which the inlet 12a is formed, and the portion of the peripheral wall 122, at which the outlets 12b, 12c are formed. The mounting portion 122a is a portion that contacts a back surface of the stationary disk 14 which is opposite to an opening surface 140 of the stationary disk 14. The mounting portion 122a is formed at the portion of the peripheral wall 122 where an inner diameter of the peripheral wall 122 changes. Specifically, the mounting portion 122a is a flat portion that extends in the radial direction DRr. A receiving groove 122b, which receives a gasket 15 described later, is formed at the mounting portion 122a.

Furthermore, the peripheral wall 122 has a first disk opposing portion 122c, which is opposed to the stationary disk 14 in the radial direction DRr, and a second disk opposing portion 122d, which is opposed to the drive disk 22 in the radial direction DRr.

Figure 6:
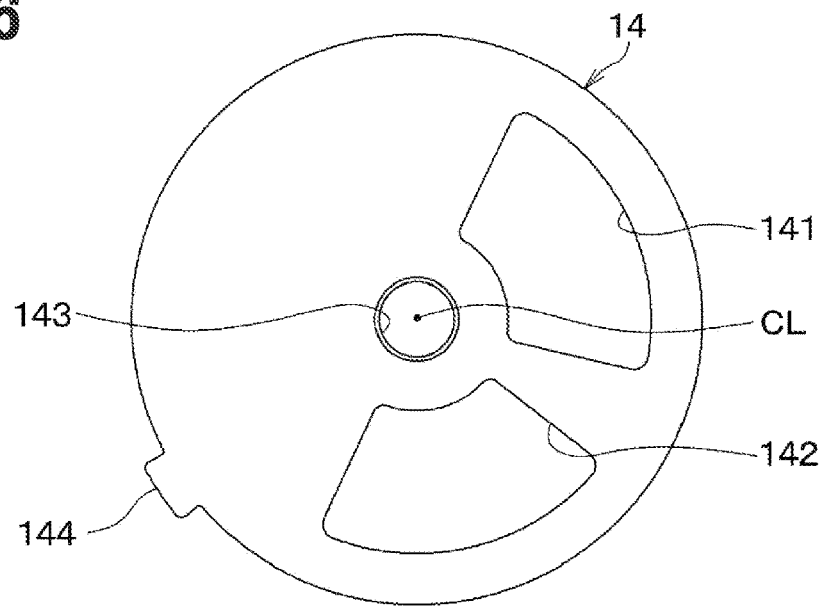
FIG. 6 is a bottom view of a stationary disk.

The first disk opposing portion 122c has a receiving groove (not shown) that receives a rotation stop projection 144 of the stationary disk 14 shown in FIG. 6. The rotation of the stationary disk 14 may be stopped by, for example, a rotation stop pin instead of the rotation stop projection 144.

An inner diameter Dh of the first disk opposing portion 122c is larger than an outer diameter Dd of a remaining portion of the stationary disk 14, which is other than the rotation stop projection 144. Thereby, a gap is formed between the stationary disk 14 and the peripheral wall 122 in a state where the stationary disk 14 is placed on the mounting portion 122a. In other words, the stationary disk 14 is not positioned by the peripheral wall 122.

An inner diameter of the second disk opposing portion 122d is larger than the inner diameter of the first disk opposing portion 122c. The inner diameter of the second disk opposing portion 122d is larger than an outer diameter of the drive disk 22. Thereby, a gap is formed between the drive disk 22 and the peripheral wall 122. That is, the drive disk 22 does not contact the peripheral wall 122 and is not positioned by the peripheral wall 122. The outer diameter of the drive disk 22 is substantially the same as an outer diameter Dd of the stationary disk 14.

The inside of the housing 12 is partitioned by the stationary disk 14 into an inlet-side space 12d and an outlet-side space 12e. The inlet-side space 12d is a space that is communicated with the inlet 12a at the inside of the housing 12. The outlet-side space 12e is a space that is communicated with the first outlet 12b and the second outlet 12c at the inside of the housing 12.

Although not shown in the drawing, a partition portion, which is shaped in a plate form, is formed at the inside of the main body 120. The partition portion partitions the outlet-side space 12e into a first outlet-side space, which is communicated with the first passage hole 141, and a second outlet-side space, which is communicated with the second passage hole 142. This partition portion is formed to extend across the outlet-side space 12e in the radial direction DRr.

The main-body cover 124 is a lid member that covers the opening 120a of the main body 120. The main-body cover 124 has a plate portion 124a, a rib portion 124b, a boss portion 124c and a spring guide 125. The plate portion 124a, the rib portion 124b, the boss portion 124c and the spring guide 125 are formed integrally in one-piece as an integral molded product.

The plate portion 124a is a portion that is shaped in a circular ring form which extends in the radial direction DRr. In the main-body cover 124, the plate portion 124a forms the inlet-side space 12d in corporation with the peripheral wall 122 and the stationary disk 14.

The rib portion 124b is a portion of the main-body cover 124 that is fitted into the opening 120a of the main body 120. The rib portion 124b is shaped in a tubular form and is placed on a radially outer side of the plate portion 124a. The rib portion 124b is formed to project from the plate portion 124a toward the bottom wall 121. An 124d, which seals a gap between the main body 120 and the main-body cover 124, is placed between the rib portion 124b and the peripheral wall 122.

The boss portion 124c is a portion through which the shaft 18 is inserted. The boss portion 124c is shaped in a tubular form and is placed on a radially inner side of the plate portion 124a. The boss portion 124c projects from the plate portion 124a toward the one side in the axial direction DRa. The boss portion 124c is provided with: a shaft seal 124e, which is placed at the inside of the boss portion 124c; and an O-ring 124f, which is placed at the outside of the boss portion 124c and seals a gap between the boss portion 124c and the drive device 16. The shaft seal 124e is a seal member which is shaped in a ring form and seals a gap between the boss portion 124c and the shaft 18. Furthermore, a bearing 124g, which rotatably supports the shaft 18, is placed at the inside of the boss portion 124c.

Figure 4:
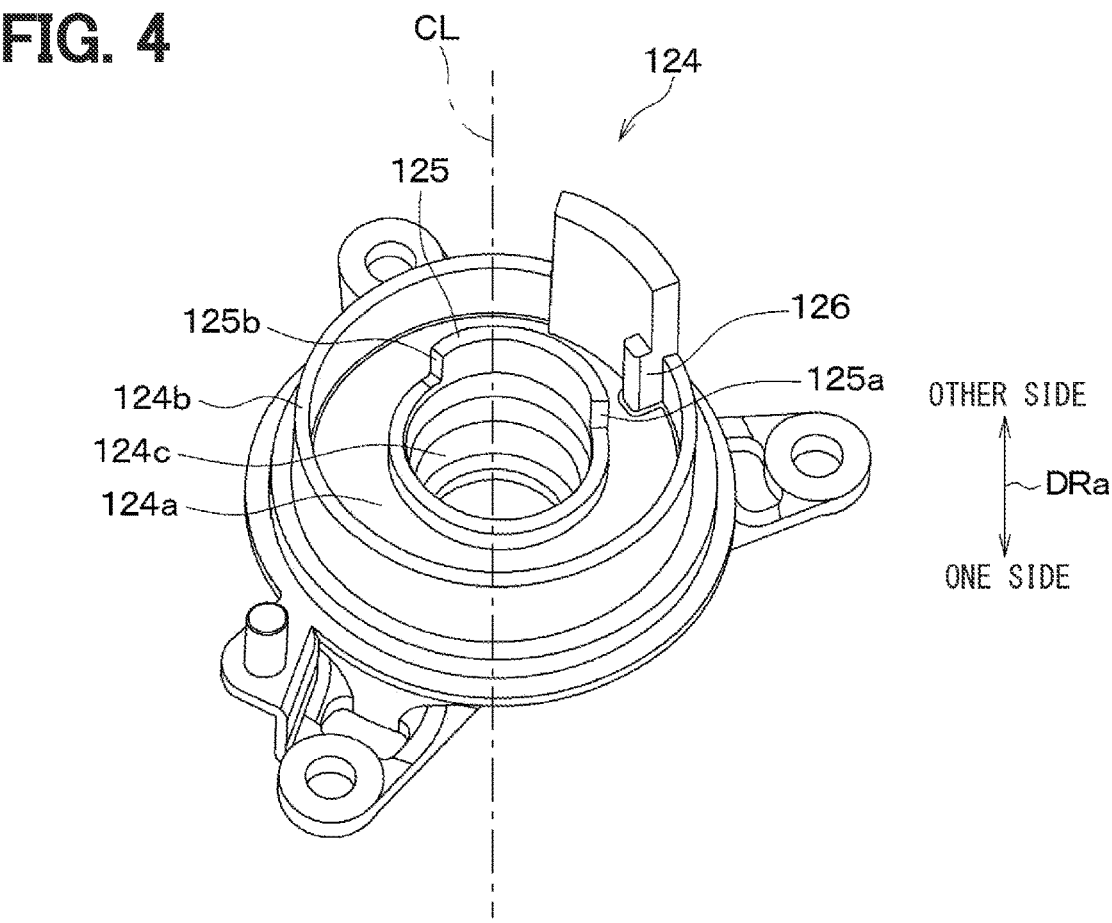
FIG. 4 is a perspective view of a main-body cover taken from the other side in an axial direction.
Figure 5:
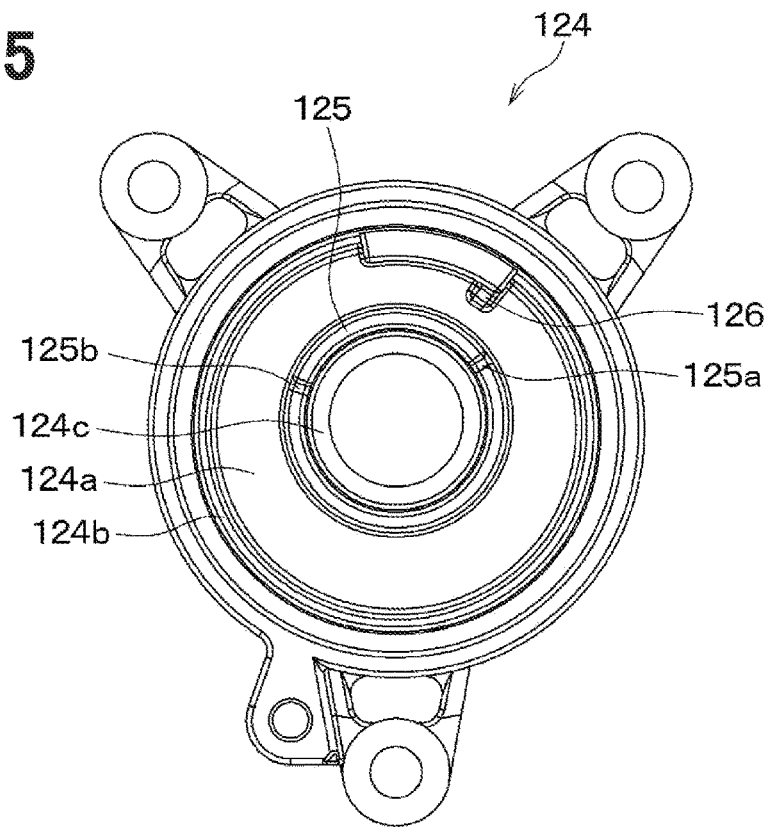
FIG. 5 is a bottom view of the main-body cover.

The spring guide 125 is a guide member that limits the first torsion spring 28 in a proper position, so that the first torsion spring 28 properly functions. The spring guide 125 is placed at the inside of the first torsion spring 28 and is circumferentially arranged around the central axis CL. Specifically, the spring guide 125 is placed on the radially inner side of the plate portion 124a like the boss portion 124c. As shown in FIG. 4, the spring guide 125 projects from the plate portion 124a toward the other side in the axial direction DRa. As shown in FIG. 5, the spring guide 125 is arcuately curved (arcuately extends) about the central axis CL.

Two opposite end portions of the spring guide 125, which are opposite to each other in the circumferential direction DRc, form a first stopper 125a and a second stopper 125b, respectively, which limit the rotation of the shaft 18. Each of the stoppers 125a, 125b is configured to contact the shaft 18 and limit a rotational drive range of the shaft 18 when the shaft 18 is rotated to a corresponding predetermined position.

The first stopper 125a is placed at one end portion of the spring guide 125 in the circumferential direction DRc and limits the rotation of the shaft 18 in a first rotational direction R1. Specifically, the first stopper 125a contacts a rotation limiter 189 of the shaft 18 when the shaft 18 is rotated to an initial rotational position.

The second stopper 125b is placed at the other end portion of the spring guide 125 in the circumferential direction DRc and limits the rotation of the shaft 18 in a second rotational direction R2. Specifically, the second stopper 125b contacts the rotation limiter 189 of the shaft 18 when the shaft 18 is rotated to a maximum rotational position.

The stationary disk 14 is made of a circular disk member. The stationary disk 14 is placed at the inside of the housing 12 and is oriented such that a thickness direction of the stationary disk 14 coincides with the axial direction DRa. The stationary disk 14 has the opening surface 140 that is a front surface of the stationary disk 14 along which the drive disk 22 slides. The opening surface 140 is a contact surface that contacts a sliding surface 220 of the drive disk 22 which will be described later.

It is desirable that the stationary disk 14 is made of a material that has a smaller linear expansion coefficient and has superior wear resistance than the material of the housing 12. The material of the stationary disk 14 is a high-hardness material that is harder than the material of the housing 12. Specifically, the stationary disk 14 is made of ceramic. The stationary disk 14 is a powder molded product that is formed by molding ceramic powder into a desired shape with a press machine. Alternatively, the stationary disk 14 may be formed such that only a portion of the stationary disk 14, which forms the opening surface 140, is made of the material, such as the ceramic, which has the smaller linear expansion coefficient and the superior wear resistance than the material of the housing 12.

In addition, the stationary disk 14 serves as a flow passage forming portion that has the passage holes 141, 142 through each of which the fluid is conducted. Therefore, in the valve device 10 of the present embodiment, the stationary disk 14, which serves as the flow passage forming portion, is formed as a separate member that is formed separately from the housing 12.

As shown in FIG. 6, the stationary disk 14 has the first passage hole 141 and the second passage hole 142 through each of which the fluid passes. The first passage hole 141 and the second passage hole 142 are formed in the stationary disk 14 at a location, which is spaced from the central axis CL of the shaft 18, such that the first passage hole 141 and the second passage hole 142 do not overlap with the central axis CL of the shaft 18. Each of the first passage hole 141 and the second passage hole 142 is a through-hole that is shaped in a sector shape (i.e., fan shape), and each of the first passage hole 141 and the second passage hole 142 functions as a communication passage that communicates between the inlet-side space 12d and the outlet-side space 12e. Here, it should be noted that the first passage hole 141 and the second passage hole 142 may be formed in any other shape such as a circular shape or an elliptical shape.

Specifically, the first passage hole 141 is formed at a portion of the stationary disk 14, which corresponds to the first outlet-side space, such that the first passage hole 141 is communicated with the first outlet-side space. Furthermore, the second passage hole 142 is formed at a portion of the stationary disk 14, which corresponds to the second outlet-side space, such that the second passage hole 142 is communicated with the second outlet-side space.

A stationary disk hole 143 is formed at generally a center part of the stationary disk 14. The stationary disk hole 143 is a stationary-side insertion hole, through which the shaft 18 is inserted. The stationary disk hole 143 has an inner diameter that is larger than a diameter of the shaft 18 and is set to limit sliding of the shaft 18 relative to the stationary disk hole 143.

The gasket 15, which seals a gap between the stationary disk 14 and the mounting portion 122a, is placed between the stationary disk 14 and the mounting portion 122a. The gasket 15 is made of rubber. The gasket 15 is received in the receiving groove 122b formed at the mounting portion 122a. The gasket 15 has at least two projections at a seal surface thereof opposed to the stationary disk 14 and at least two projections at another seal surface thereof opposed to the mounting portion 122a. Specifically, the gasket 15 has two projections that project in the axial direction DRa at each of the seal surfaces thereof. This type of gasket 15 can be obtained by, for example, a simple technique such as forming a recess in a flat seal surface.

Figure 7:
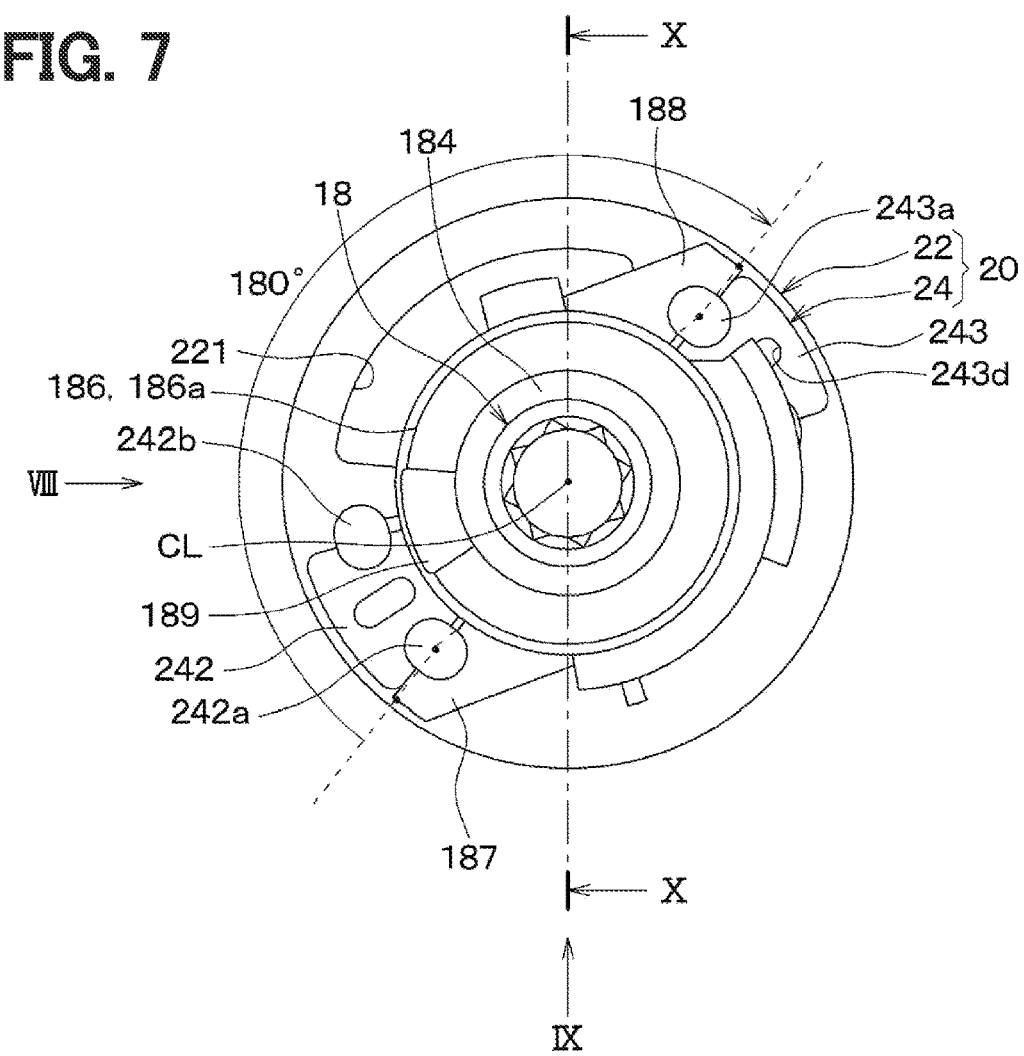
FIG. 7 is a plan view of an assembly of a shaft, a rotor and a lever.

As shown in FIGS. 3 and 7, the shaft 18 is a rotatable shaft that is rotated about the central axis CL, which is predetermined, by the rotational force outputted from the drive device 16. The shaft 18 extends in the axial direction DRa. Two axial sides of the shaft 18, which are opposite to each other in the axial direction DRa, are rotatably supported by the housing 12. That is, the shaft 18 has a double end support structure. The shaft 18 extends through the stationary disk 14 and the drive disk 22 and is rotatably supported relative to the housing 12. Specifically, the one axial side of the shaft 18, which faces the one side in the axial direction DRa, is rotatably supported by the bearing 124g that is placed at the inside of the main-body cover 124. Furthermore, the other axial side of the shaft 18, which faces the other side in the axial direction DRa, is supported by a bearing hole 121c formed at the bottom wall 121 of the main body 120. The bearing hole 121c is formed by a plain bearing. It should be noted that the bearing hole 121c may be formed by a ball bearing or the like instead of the plain bearing.

As shown in FIGS. 3, 8, 9 and 10, the shaft 18 includes a shaft core 181 and a holder 182. The shaft core 181 is made of metal, and the holder 182 is made of resin and is coupled to the shaft core 181. The shaft core 181 and the holder 182 are coupled together to integrally rotate. The shaft core 181 and the holder 182 are formed as an insert molded product that is formed integrally by insert molding.

The shaft core 181 includes the central axis CL of the shaft 18 and extends in the axial direction DRa. The shaft core 181 is a portion that serves as a rotational center of the rotor 20. The shaft core 181 is formed by a rod member made of metal to ensure straightness of the shaft core 181.

The holder 182 is coupled to the one axial side of the shaft core 181 which faces the one side in the axial direction DRa. The holder 182 is shaped in a bottomed tubular form. The shaft core 181 is coupled to an inside of a distal end portion of the holder 182 which is located on the one side in the axial direction DRa. In other words, the one end portion of the shaft core 181, which faces the one side in the axial direction DRa, is placed at the inside of the distal end portion of the holder 182. The distal end portion of the holder 182, which projects to the outside of the housing 12, is coupled to a gear arrangement 162 of the drive device 16.

An inner diameter of the holder 182 increases stepwise from the one side toward the other side in the axial direction DRa. Specifically, the holder 182 includes: a shaft coupling portion 183 which is located on the one axial side in the axial direction DRa; an intermediate portion 184 which is connected to the shaft coupling portion 183; a small diameter portion 185 which is connected to the intermediate portion 184; and a large diameter portion 186 which is connected to the small diameter portion 185. The inner diameter of the holder 182 is increased in an order of the shaft coupling portion 183, the intermediate portion 184, the small diameter portion 185 and the large diameter portion 186.

The shaft coupling portion 183 is the distal end portion of the holder 182 which is located on the one axial side in the axial direction DRa. The shaft core 181 is coupled to the shaft coupling portion 183. An outer part of the shaft coupling portion 183, which projects to the outside of the boss portion 124*c*, has a shaft gear 183*a* that is meshed with a part of the gear arrangement 162. An outer periphery of the shaft coupling portion 183, which is located at the inside of the boss portion 124*c*, is supported by the bearing 124*g*.

The intermediate portion 184 is a portion which is placed at the inside of the boss portion 124*c*. The intermediate portion 184 has an inner diameter slightly larger than the outer diameter of the shaft core 181. The shaft seal 124*e*, which is a seal member, is placed at the outside of the intermediate portion 184. The intermediate portion 184 forms a contact portion that contacts the shaft seal 124*e* which is the seal member.

The small diameter portion 185 forms a space in which the compression spring 26 described later is placed. The small diameter portion 185 has the inner diameter which is slightly larger than the inner diameter of the intermediate portion 184. A connecting end surface 185*a*, which connects between the intermediate portion 184 and the small diameter portion 185, is a contact portion to which one end portion of the compression spring 26 contacts. The large diameter portion 186 is connected to an outside of the small diameter portion 185.

The large diameter portion 186 is located on the outer side of the small diameter portion 185 in the radial direction DRr. The large diameter portion 186 has an inner diameter that is slightly larger than an inner diameter of the small diameter portion 185. The large diameter portion 186 has: a body portion 186*a* shaped in a tubular form; a first large diameter anchoring portion 186*b*; a second large diameter anchoring portion 186*c*, a first flange portion 187; and a second flange portion 188.

Figure 9:
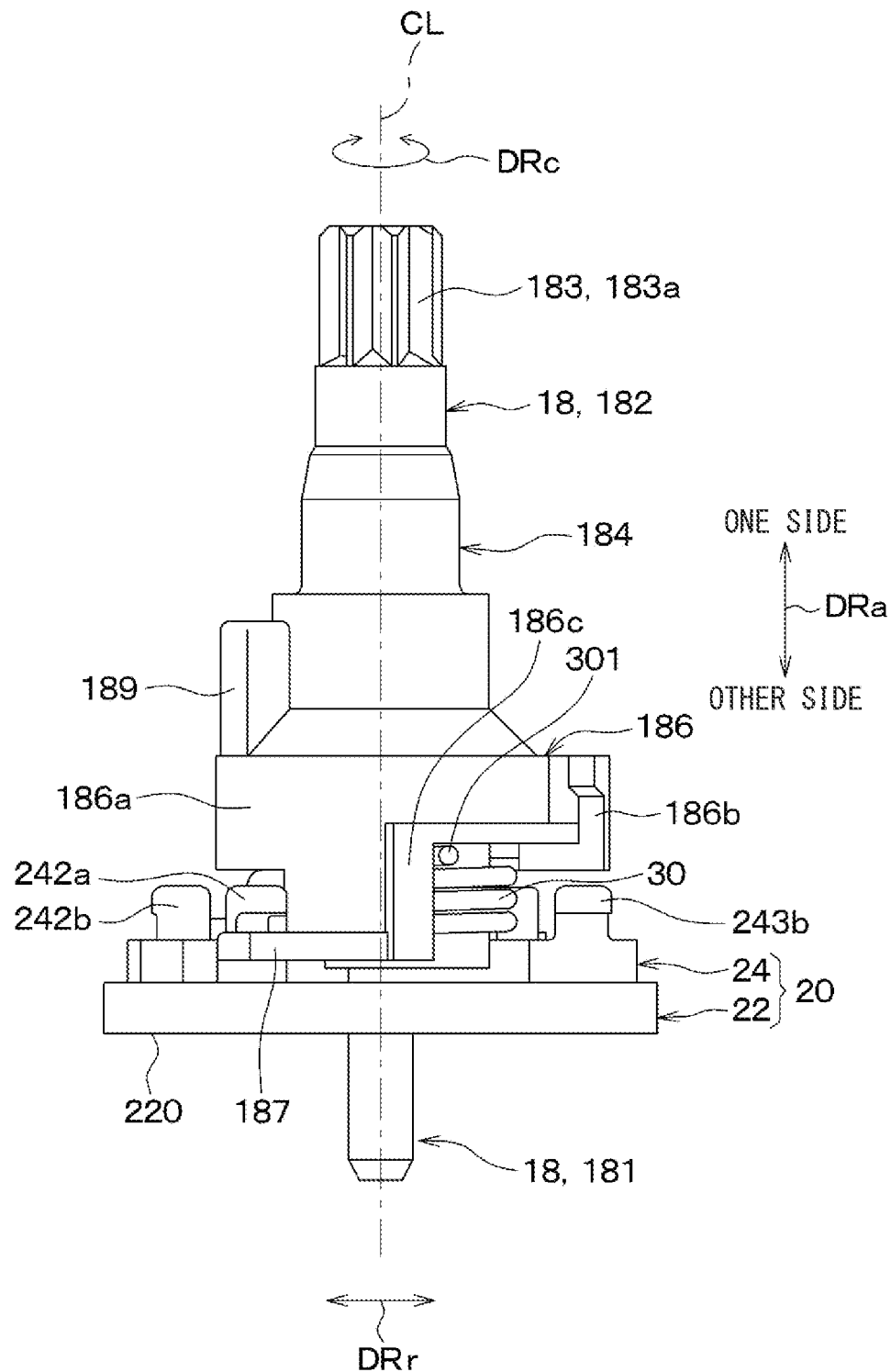
FIG. 9 is a perspective view of the assembly of the shaft, the rotor and the lever viewed in a direction of an arrow IX in FIG. 7.

The first large diameter anchoring portion 186*b* is a hook anchoring portion to which a hook 282 of the first torsion spring 28 is anchored. As shown in FIG. 9, the first large diameter anchoring portion 186*b* is formed at an outside of the body portion 186*a* at one axial side of the body portion 186*a*, which is located on the one side in the axial direction DRa. The first large diameter anchoring portion 186*b* outwardly projects from the body portion 186*a* in the radial direction DRr such that the first large diameter anchoring portion 186*b* is opposed to the hook 282 of the first torsion spring 28 in the circumferential direction DRc.

The second large diameter anchoring portion 186*c* is a hook anchoring portion to which a hook 301 of the second torsion spring 30 is anchored. As shown in FIG. 9, the second large diameter anchoring portion 186*c* is formed at the outside of the body portion 186*a* on the other side of the first large diameter anchoring portion 186*b* in the axial direction DRa. The second large diameter anchoring portion 186*c* outwardly projects from the body portion 186*a* in the radial direction DRr such that the second large diameter anchoring portion 186*c* is opposed to the hook 301 of the second torsion spring 30 in the circumferential direction DRc.

Each of the first flange portion 187 and the second flange portion 188 is an anchoring piece through which the shaft 18 engages with a corresponding engaging portion of the lever 24 described later. Each of the first flange portion 187 and the second flange portion 188 is formed at the outside of the body portion 186*a* on the other side of the second large diameter anchoring portion 186*c* in the axial direction DRa. As shown in FIG. 7, the first flange portion 187 and the second flange portion 188 are shaped to be generally point-symmetric to each other with respect to the central axis CL of the shaft 18. Each of the first flange portion 187 and the second flange portion 188 outwardly projects from the body portion 186*a* in the radial direction DRr such that each of the first flange portion 187 and the second flange portion 188 is opposed to the corresponding engaging portion of the lever 24 in the circumferential direction DRc.

The holder 182, which is formed in the above-described manner, receives the urging force of the first torsion spring 28 and the urging force of the second torsion spring 30 by having the first large diameter anchoring portion 186*b* and the second large diameter anchoring portion 186*c*. Since the holder 182 has the first flange portion 187 and the second flange portion 188, the shaft 18 contacts the lever 24 at the different locations which are displaced from each other in the circumferential direction DRc. That is, the shaft 18 has the plurality of contact portions that are configured to contact the lever 24 and are respectively located at the plurality of locations which are displaced from each other in the circumferential direction DRc.

Furthermore, the holder 182 has the rotation limiter 189 which limits the rotational drive range of the shaft 18 in the circumferential direction DRc. The rotation limiter 189 is formed at the intermediate portion 184 of the holder 182 at a location that is on a lower side of the contact portion of the intermediate portion 184 which contacts the shaft seal 124*e*. The rotation limiter 189 is a projection that projects in the radial direction DRr. When the rotation limiter 189 contacts one of the stoppers 125*a*, 125*b*, the rotational drive range of the shaft 18 in the circumferential direction DRc is limited.

Here, the rotation limiter 189 projects in the radial direction DRr such that the rotation limiter 189 overlaps with each of the stoppers 125*a*, 125*b* in the circumferential direction DRc. The rotation limiter 189 is placed at the inside of the first torsion spring 28 like the stoppers 125*a*, 125b. The rotation limiter 189 is configured to contact the stopper 125a, 125b at the inside of the first torsion spring 28. With this configuration, it is possible to limit the force which is applied to the rotation limiter 189 and the stopper 125a, 125b in the circumferential direction DRc at the time when the rotation limiter 189 contacts the stopper 125a, 125b. Therefore, flexing of the stopper 125a, 125b in the circumferential direction DRc is limited at the time when the rotation limiter 189 collides the stopper 125a, 125b.

Figure 11:
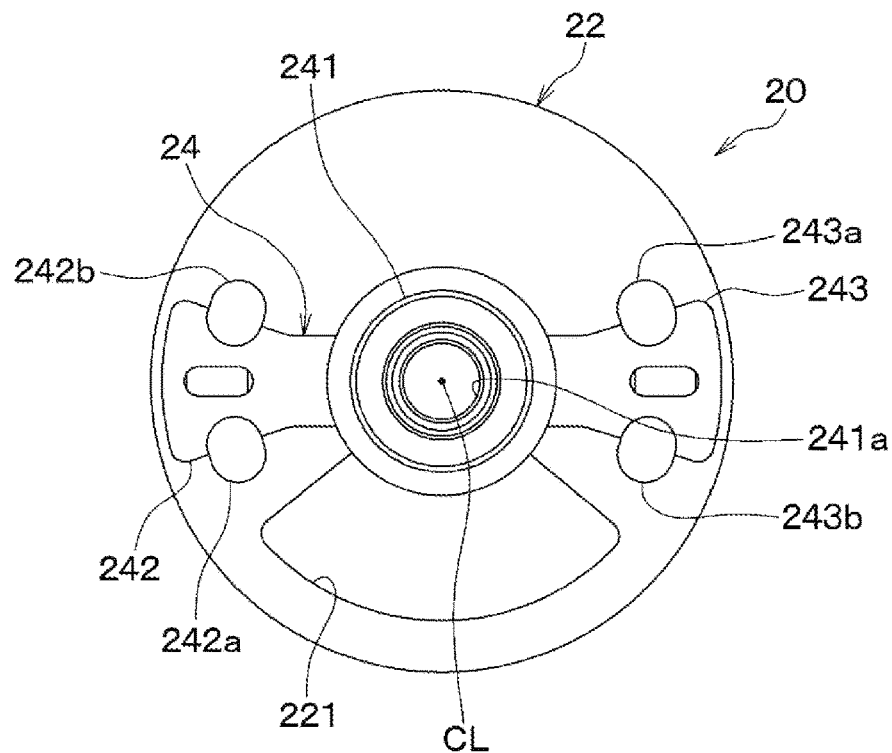
FIG. 11 is a plan view of the rotor.

The rotor 20 is rotated about the central axis CL of the shaft 18 by the output of the drive device 16. The rotor 20 increases or decreases the opening degree of each of the passage holes 141, 142 of the stationary disk 14 in response to the rotation of the shaft 18. As shown in FIG. 11, the rotor 20 includes: the drive disk 22, which serves as a valve element; and the lever 24, which couples the drive disk 22 to the shaft 18.

Figure 12:
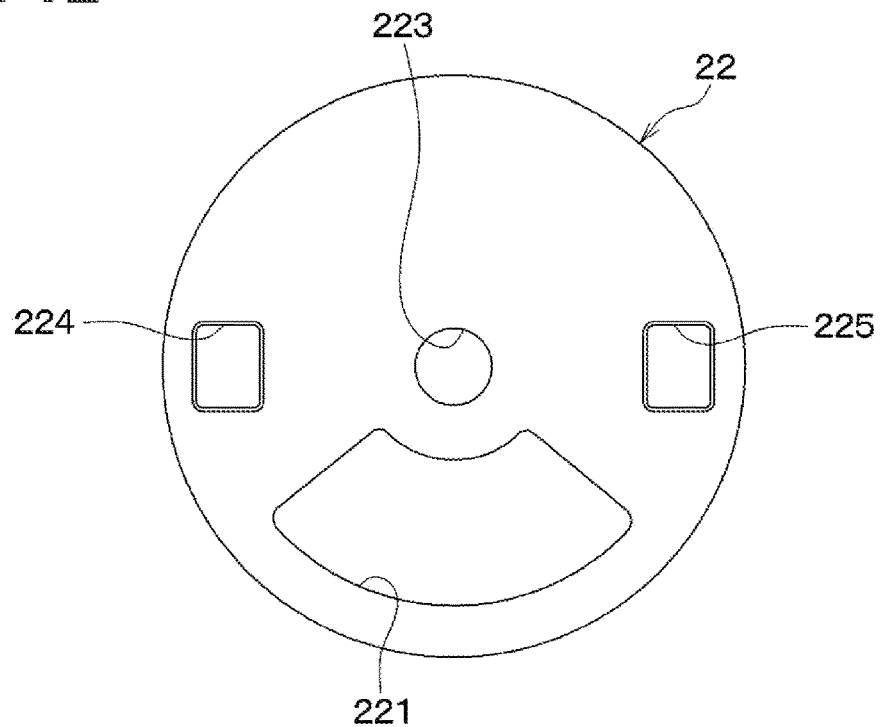
FIG. 12 is a plan view of a drive disk.
Figure 13:
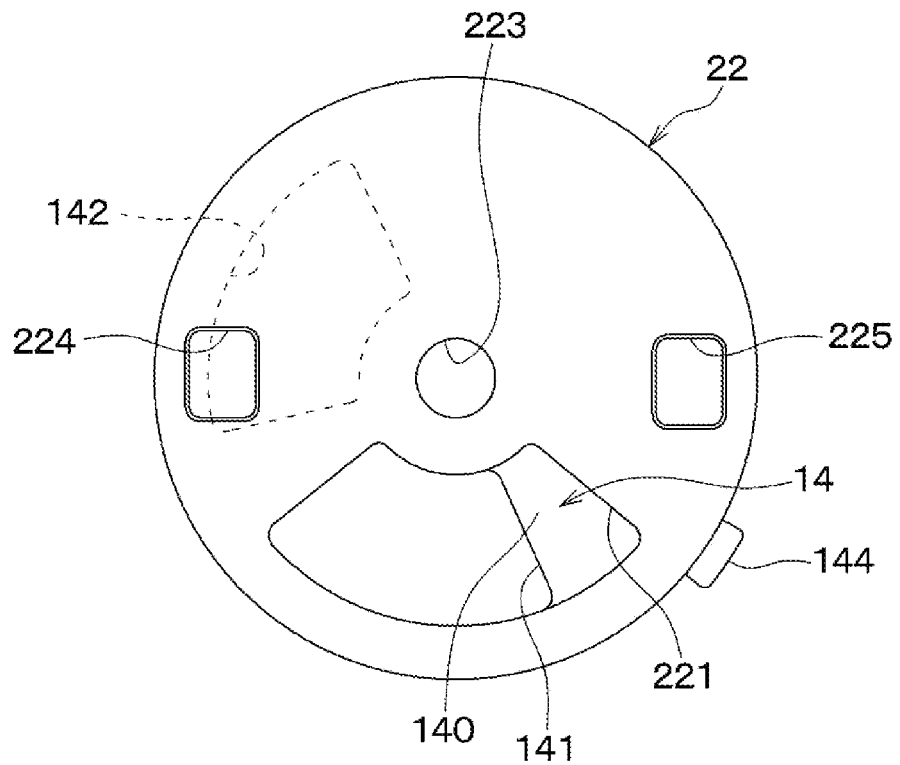
FIG. 13 is a plan view showing a state where the drive disk is placed on the stationary disk.

As shown in FIGS. 11, 12 and 13, the drive disk 22 is the valve element that increases or decreases the opening degree of the first passage hole 141 and the opening degree of the second passage hole 142 in response to the rotation of the shaft 18. The opening degree of the first passage hole 141 is a degree of opening of the first passage hole 141. Here, the opening degree of the first passage hole 141 in a full-opening state of the first passage hole 141 is indicated as 100%, and the opening degree of the first passage hole 141 in a full-closing state of the first passage hole 141 is indicated as 0%. The full opening state of the first passage hole 141 is, for example, a state where the first passage hole 141 is not closed by the drive disk 22 at all. The full closing state of the first passage hole 141 is, for example, a state where the first passage hole 141 is entirely closed by the drive disk 22. The opening degree of the second passage hole 142 is the same as the opening degree of the first passage hole 141.

The drive disk 22 is made of a circular disk member. The drive disk 22 is placed at the inside of the housing 12 and is oriented such that a thickness direction of the drive disk 22 coincides with the axial direction DRa. The drive disk 22 is placed in the inlet-side space 12d such that the drive disk 22 is opposed to the stationary disk 14 in the axial direction DRa. The drive disk 22 has the sliding surface 220 that is opposed to the opening surface 140 of the stationary disk 14. The sliding surface 220 is a seal surface that seals the opening surface 140 of the stationary disk 14.

Preferably, the drive disk 22 is made of a material that has a smaller coefficient of linear expansion and superior wear resistance in comparison to the material of the housing 12. The material of the drive disk 22 is a high-hardness material that is harder than the material of the housing 12. Specifically, the drive disk 22 is made of ceramic. The drive disk 22 is a powder molded product that is formed by molding ceramic powder into a desired shape with a press machine. Alternatively, the drive disk 22 may be formed such that only a portion of the drive disk 22, which forms the sliding surface 220, is made of the material, such as the ceramic, which has the smaller linear expansion coefficient and the superior wear resistance than the material of the housing 12.

The ceramic is a material that has: a small linear expansion coefficient; a small dimensional change upon absorption of water; and excellent wear resistance. When the drive disk 22 is made of the ceramic, a relative positional relationship between the drive disk 22 and the shaft 18 and a relative positional relationship between the drive disk 22 and the housing 12 are stabilized. As a result, it is possible to ensure the accuracy of the flow rate control of the fluid and limit unintended fluid leakage.

A rotor hole 221 is formed at the drive disk 22 at a location that is displaced from the central axis CL of the shaft 18. The rotor hole 221 is a through-hole that extends through the drive disk 22 in the axial direction DRa. The rotor hole 221 is formed at a portion of the drive disk 22 where the rotor hole 221 can overlap with the first passage hole 141 and the second passage hole 142 in the axial direction DRa when the drive disk 22 is rotated about the central axis CL of the shaft 18.

The drive disk 22 has a shaft insertion hole 223 at a substantially center part of the drive disk 22. The shaft insertion hole 223 is a drive-side insertion hole through which the shaft 18 is inserted. An inner diameter of the shaft insertion hole 223 is larger than a diameter of the shaft 18, so that the shaft 18 does not slide relative to the shaft insertion hole 223. The drive disk 22 has a first press-fitting groove 224 and a second press-fitting groove 225, into which portions of the lever 24 are respectively press-fitted.

In the valve device 10, when the drive disk 22 is rotated to a position where the rotor hole 221 overlaps with the first passage hole 141 in the axial direction DRa, the first passage hole 141 is opened. Furthermore, in the valve device 10, when the drive disk 22 is rotated to a position where the rotor hole 221 overlaps with the second passage hole 142 in the axial direction DRa, the second passage hole 142 is opened.

The drive disk 22 is configured to adjust a flow rate ratio between a flow rate of the fluid, which passes through the first passage hole 141, and a flow rate of the fluid, which passes through the second passage hole 142. That is, the drive disk 22 is configured to decrease the opening degree of the second passage hole 142 in response to an increase in the opening degree of the first passage hole 141.

The lever 24 is a coupling member that couples the drive disk 22 to the shaft 18. The lever 24 is fixed to the drive disk 22 and couples between the drive disk 22 and the shaft 18 to enable integral rotation of the drive disk 22 and the shaft 18 in a state where the drive disk 22 is displaceable in the axial direction DRa of the shaft 18.

Specifically, as shown in FIG. 11, the lever 24 includes a circular disk portion 241, a first arm portion 242 and a second arm portion 243. The circular disk portion 241, the first arm portion 242 and the second arm portion 243 are formed integrally in one-piece as an integral molded product.

An intermediate insertion hole 241a, through which the shaft 18 is inserted, is formed generally at a center of the circular disk portion 241. The circular disk portion 241 is sized such that the circular disk portion 241 does not overlap with the shaft insertion hole 223 in the axial direction DRa. The first arm portion 242 and the second arm portion 243 are joined to the circular disk portion 241.

Each of the first arm portion 242 and the second arm portion 243 outwardly projects from the circular disk portion 241 in the radial direction DRr. The first arm portion 242 and the second arm portion 243 project in opposite directions, respectively.

Specifically, the first arm portion 242 has a first engaging claw 242a and a second engaging claw 242b which project in the axial direction DRa from a side of the first arm portion 242 that is opposite to an opposing surface of the first arm portion 242 opposed to the drive disk 22. Each of the first engaging claw 242a and the second engaging claw 242b is shaped in an L-shape. A root side of each of the first engaging claw 242a and the second engaging claw 242b extends in the axial direction DRa, and a distal end side of each of the first engaging claw 242a and the second engaging claw 242b projects in the circumferential direction DRc.

The distal end side of the first engaging claw 242a and the distal end side of the second engaging claw 242b project in opposite directions, which are away from each other.

The first engaging claw 242a is configured to engage with the first flange portion 187 of the shaft 18. That is, the first engaging claw 242a is the engaging portion of the lever 24 that is configured to engage with the shaft 18. The first engaging claw 242a has a portion that is opposed to the first flange portion 187 in the axial direction DRa and the circumferential direction DRc. Furthermore, the first engaging claw 242a engages with the first flange portion 187 in a state where a gap is formed between the first engaging claw 242a and the first flange portion 187 in the axial direction DRa. Thereby, the lever 24 and the drive disk 22 are coupled to the shaft 18 in a state where the lever and the drive disk 22 are displaceable in the axial direction DRa.

The second engaging claw 242b is a hook anchoring portion to which a hook 302 of the second torsion spring 30 is anchored. When the hook 302 of the second torsion spring 30 is anchored to the second engaging claw 242b, an urging force of the second torsion spring 30 is applied to the lever 24. As a result, the contact state, in which the first engaging claw 242a and the first flange portion 187 contact with each other, is maintained by the urging force of the second torsion spring 30. The first engaging claw 242a is a contact portion that is configured to contact the shaft 18.

The second arm portion 243 has a third engaging claw 243a and a fourth engaging claw 243b which project in the axial direction DRa from a side of the second arm portion 243 that is opposite to an opposing surface of the second arm portion 243 opposed to the drive disk 22. The third engaging claw 243a and the fourth engaging claw 243b are configured substantially the same manner as that of the first engaging claw 242a and the second engaging claw 242b.

The third engaging claw 243a is configured to engage with the second flange portion 188 of the shaft 18. That is, the third engaging claw 243a is the engaging portion that is configured to engage with the contact portion of the shaft 18. The third engaging claw 243a has a portion that is opposed to the second flange portion 188 in the axial direction DRa and the circumferential direction DRc. Although not shown in the drawing, the third engaging claw 243a engages with the second flange portion 188 in a state where a gap is formed between the third engaging claw 243a and the second flange portion 188 in the axial direction DRa. Thereby, the lever 24 and the drive disk 22 are coupled to the shaft 18 in a state where the lever 24 and the drive disk 22 are displaceable in the axial direction DRa.

Although not depicted in the drawing, the opposing surface of each of the first arm portion 242 and the second arm portion 243, which is opposed to the drive disk 22, has a projection. The projections project toward the drive disk 22 such that the projections can be press-fitted into the first press-fitting groove 224 and the second press-fitting groove 225, respectively.

The lever 24, which is configured in the above-described manner, is fixed to the drive disk 22 by press-fitting the projections into the press-fitting grooves 224, 225, respectively. In the lever 24 of the present embodiment, the first arm portion 242 and the second arm portion 243 have substantially the identical shape so as to be point-symmetric to each other with respect to the intermediate insertion hole 241a. As a result, even in a state where the lever 24 is rotated by 180° in the circumferential direction DRc, the lever 24 can be assembled to the shaft 18 and the drive disk 22.

Figure 10:
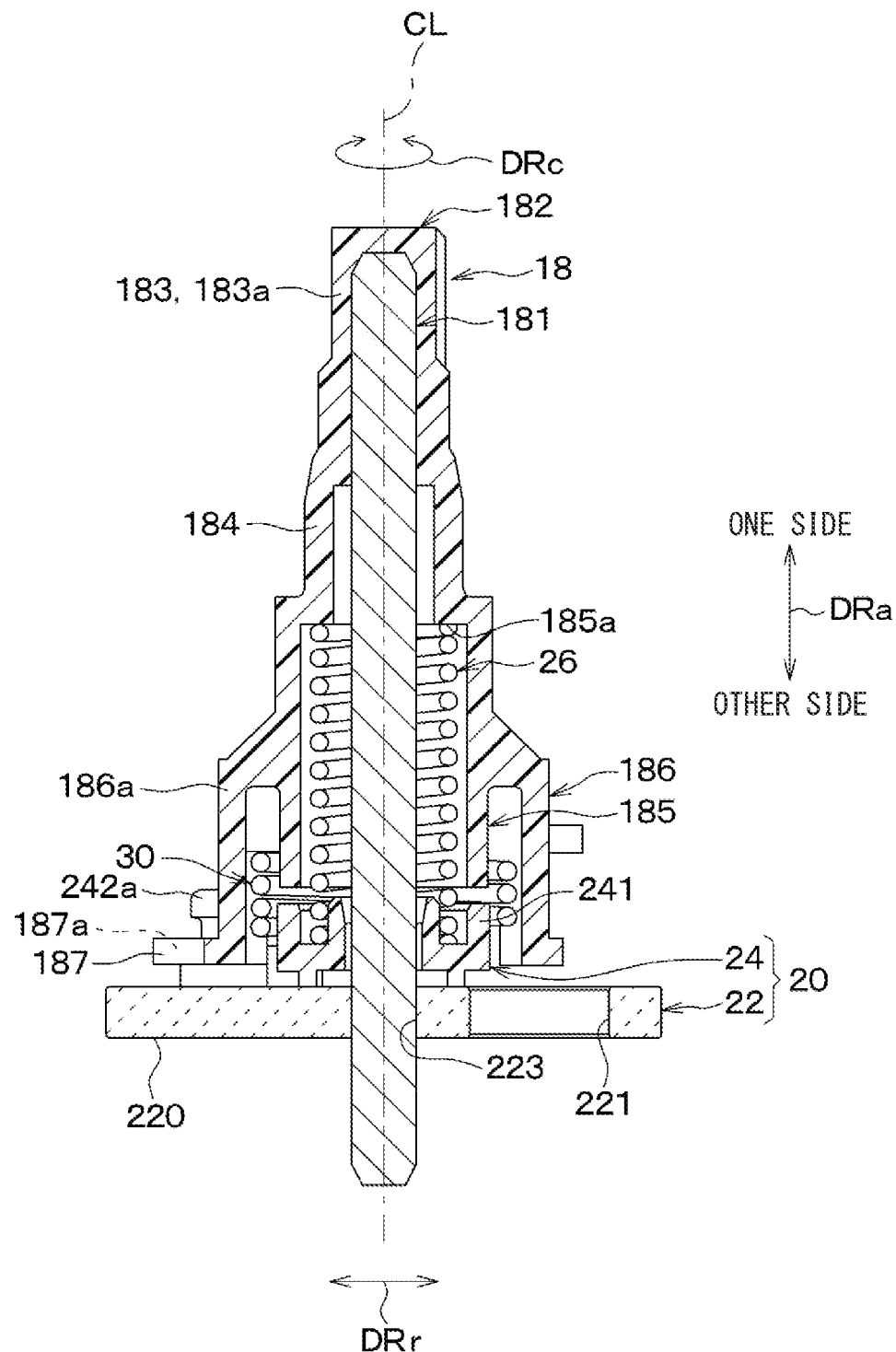
FIG. 10 is a cross-sectional view taken along line X-X in FIG. 7.

As shown in FIGS. 3 and 10, the compression spring 26 is an urging member that urges the rotor 20 against the stationary disk 14. The compression spring 26 is resiliently deformed in the axial direction DRa of the shaft 18. The compression spring 26 is placed at the inside of the housing 12 in a state where the compression spring 26 is compressed in the axial direction DRa. The one end portion of the compression spring 26, which faces the one side in the axial direction DRa, contacts the shaft 18, and the other end portion of the compression spring 26, which faces the other side in the axial direction DRa, contacts the rotor 20. More specifically, the one end portion of the compression spring 26, which faces the one side in the axial direction DRa, contacts the connecting end surface 185a of the inside of the holder 182, and the other end portion of the compression spring 26, which faces the other side in the axial direction DRa, contacts the circular disk portion 241. The compression spring 26 is not fixed to at least one of the rotor 20 and the shaft 18, so that the compression spring 26 does not function as a torsion spring.

The compression spring 26 urges the rotor 20 against the stationary disk 14, so that a contact state, in which the opening surface 140 of the stationary disk 14 and the sliding surface 220 of the drive disk 22 contact with each other, is maintained. This contact state is a state in which the opening surface 140 of the stationary disk 14 and the sliding surface 220 of the drive disk 22 make a surface-to-surface contact with each other. That is, the valve device 10 can maintain a posture of the drive disk 22 such that the drive disk 22 is in contact with the stationary disk 14.

Specifically, the compression spring 26 is arranged to surround the central axis CL of the shaft 18. In other words, the shaft 18 is placed at the inside of the compression spring 26. With this configuration, a load of the compression spring 26 on the drive disk 22 is restrained from being locally increased in the circumferential direction DRc of the shaft 18, so that the contact state between the sliding surface 220 and the opening surface 140 can be easily maintained.

The first torsion spring 28 is a spring that urges the shaft 18 relative to the housing 12 in the circumferential direction DRc around the central axis CL of the shaft 18. The first torsion spring 28 is placed between the housing 12 and the shaft 18. Specifically, the first torsion spring 28 has two hooks 281, 282 which are located at two opposite ends, respectively, of the first torsion spring 28 in the axial direction DRa and outwardly project in the radial direction DRr. For convenience of explanation, hereinafter, the hook 281, which is located on the one side in the axial direction DRa, will be referred to as a first hook 281, and the hook 282, which is located on the other side in the axial direction DRa, will be referred to as a second hook 282. In the present embodiment, the first hook 281 serves as an anchoring hook that is anchored relative to the housing 12.

Figure 14:
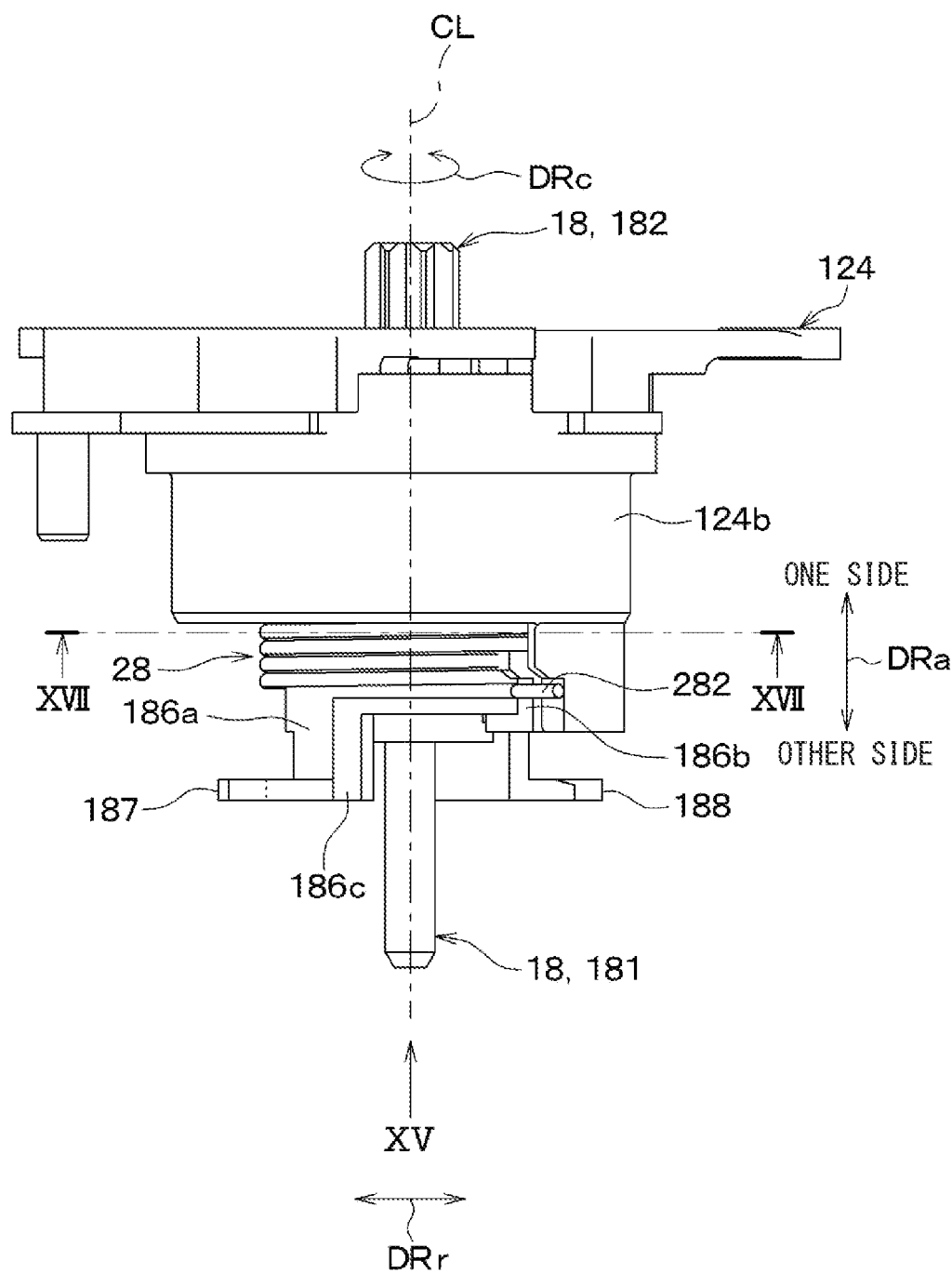
FIG. 14 is a side view of an assembly in which the shaft is assembled to the main-body cover.
Figure 15:
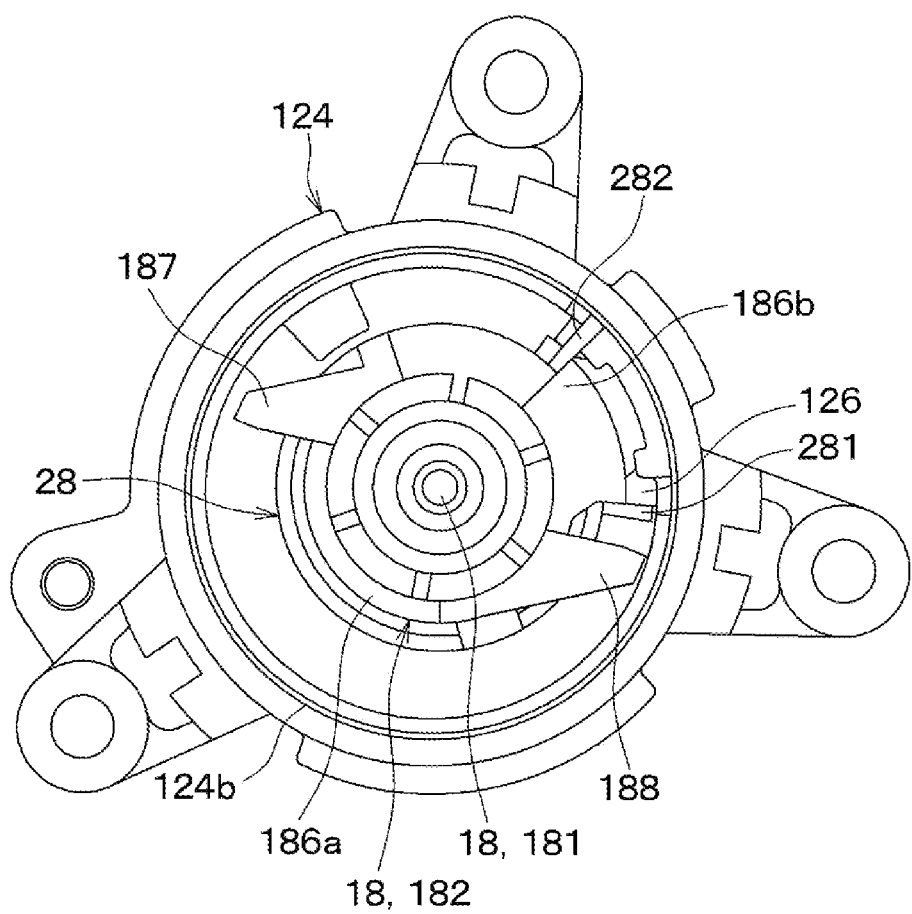
FIG. 15 is a bottom view of the assembly, in which the shaft is assembled to the main-body cover, viewed in a direction of an arrow XV in FIG. 14.

As shown in FIGS. 14 and 15, the second hook 282 is anchored to the first large diameter anchoring portion 186b of the holder 182. Since the second hook 282 is anchored to the first large diameter anchoring portion 186b, which is a rotatable member, a position of the second hook 282 changes in the circumferential direction DRc when the rotor 20 is rotated.

As shown in FIG. 15, the first hook 281 is anchored to a main body-side anchoring portion 126 of the main-body cover 124. The main body-side anchoring portion 126 is formed by a projection that is formed at the inside of the rib portion 124b. Since the first hook 281 is anchored to the main-body cover 124, which is a non-rotatable member, a position of the first hook 281 does not change even when the rotor 20 is rotated. In the present embodiment, the main body-side anchoring portion 126 serves as a hook anchoring portion, against which the first hook 281 is anchored.

The first torsion spring 28 is basically used in a state where the first torsion spring 28 is twisted and resiliently deformed in the circumferential direction DRc. The urging force of the first torsion spring 28 is exerted to the shaft 18 at the time of rotating the shaft 18 and at the time of stopping the rotation of the shaft 18. The urging force of the first torsion spring 28 is transmitted as a rotational force from the gear arrangement 162 to an electric motor 161 of the drive device 16 through the shaft 18. Therefore, by placing the first torsion spring 28 between the housing 12 and the shaft 18, rattling in the circumferential direction DRc between the drive device 16 and the shaft 18 is limited. It should be noted that the first torsion spring 28 is only twisted in the circumferential direction DRc and is not compressed in the axial direction DRa.

Now, the rotational drive range of the shaft 18 in the circumferential direction DRc will be described. The rotational drive range of the shaft 18 is a rotational range within which the shaft 18 can be rotated around the central axis CL.

Figure 16:
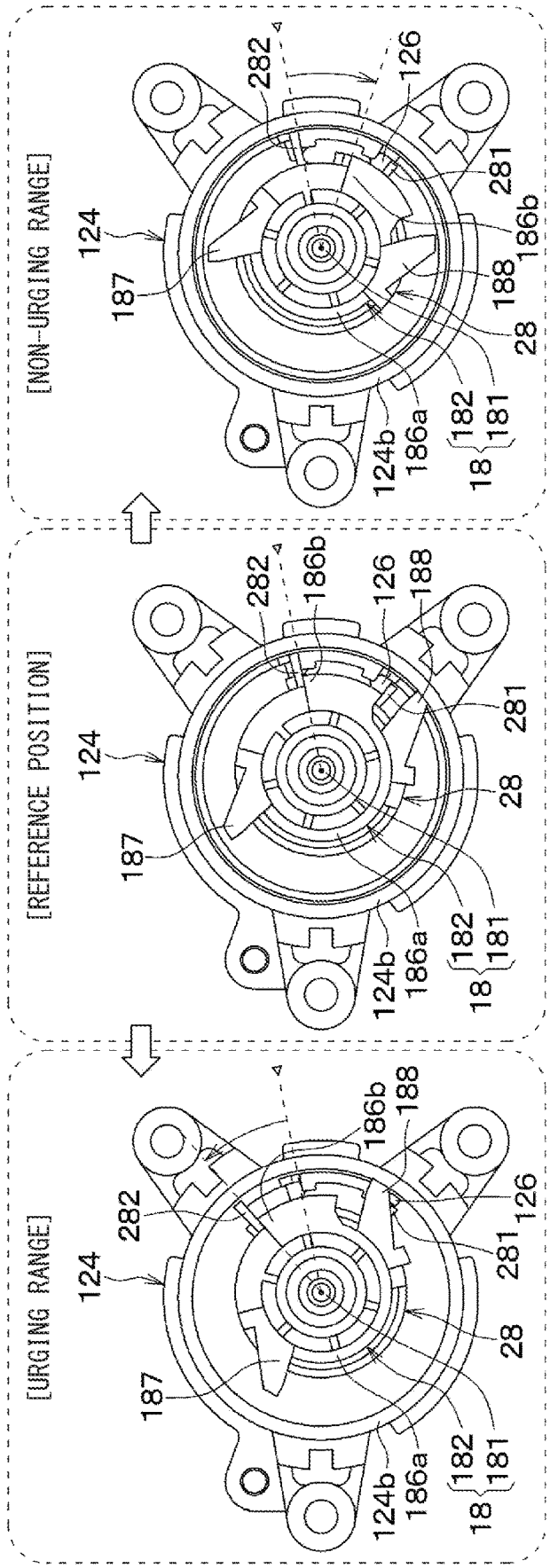
FIG. 16 is an explanatory diagram for explaining a reference position, an urging range and a non-urging range of a first torsion spring.

As shown in FIG. 16, the rotational drive range of the shaft 18 includes: an urging range, in which the first torsion spring 28 urges the shaft 18 in the circumferential direction DRc; and a non-urging range, in which the first torsion spring 28 does not urge the shaft 18 in the circumferential direction DRc. The urging range is a rotational range in which the urging force of the first torsion spring 28 is exerted to the shaft 18 while the second hook 282 is in contact with the first large diameter anchoring portion 186b. Furthermore, the non-urging range is a rotational range in which the urging force of the first torsion spring 28 is not exerted to the shaft 18 while the second hook 282 is spaced away from the first large diameter anchoring portion 186b. The reference position is a position at which the urging force of the first torsion spring 28 exerted to the shaft 18 is minimized in the state where the second hook 282 is in contact with the first large diameter anchoring portion 186b.

The shaft 18 of the present embodiment is rotatable within the rotational drive range which extends form the initial rotational position to the maximum rotational position. The initial rotational position is a rotational end position of the shaft 18 at which the rotation of the shaft 18 ends when the shaft 18 is rotated in the first rotational direction R1. The maximum rotational position is a rotational end position of the shaft 18 at which the rotation of the shaft 18 ends when the shaft 18 is rotated in the second rotational direction R2. In the present embodiment, the initial rotational position of the shaft 18 is a position of the shaft 18 at which the rotation of the shaft 18 is limited by the contact of the shaft 18 with the stopper 125a of the housing 12, and the maximum rotational position is a position of the shaft 18 at which the rotation of the shaft 18 is limited by the contact of the shaft 18 with the stopper 125b of the housing 12.

Figure 17:
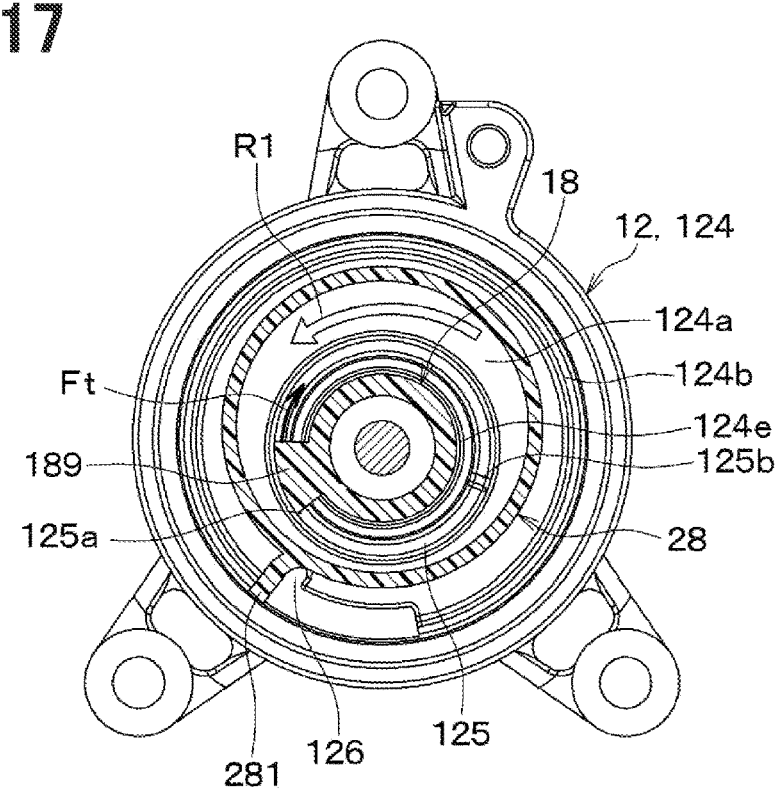
FIG. 17 is a cross-sectional view taken along line XVII-XVII in FIG. 14, indicating a state where the shaft is in an initial rotational position thereof.
Figure 18:
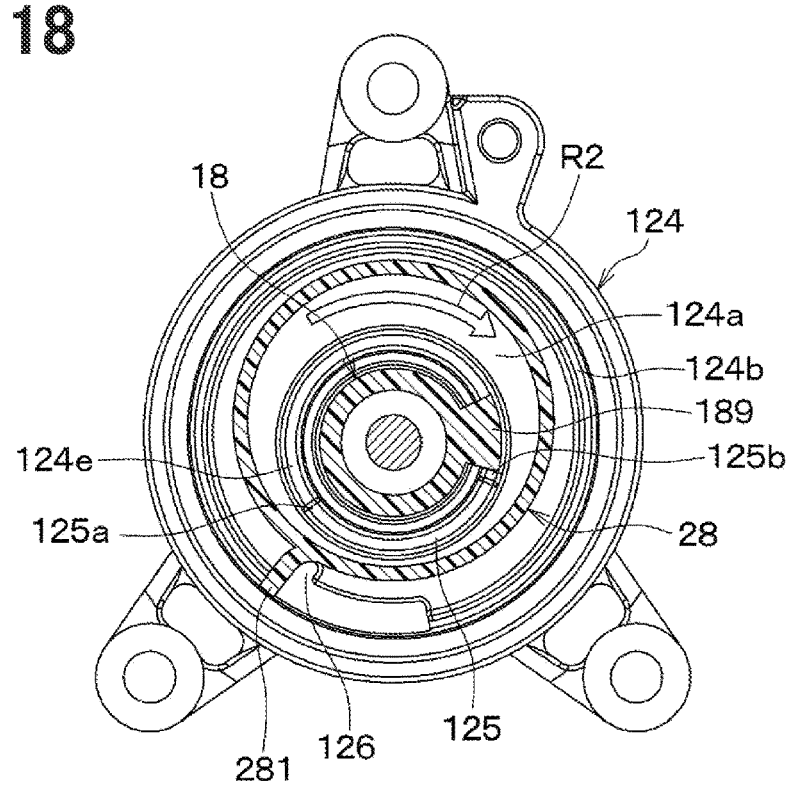
FIG. 18 is a cross-sectional view taken along line XVII-XVII in FIG. 14, indicating a state where the shaft is in a maximum rotational position thereof.

As shown in FIG. 17, the rotational position of the shaft 18, at which the shaft 18 contacts the first stopper 125a upon the rotation of the shaft 18 in the first rotational direction R1, is defined as the initial rotational position of the shaft 18. Furthermore, as shown in FIG. 18, the rotational position of the shaft 18, at which the shaft 18 contacts the second stopper 125b upon the rotation of the shaft 18 in the second rotational direction R2, is defined as the maximum rotational position.

The first torsion spring 28 urges the shaft 18 relative to the housing 12 in the second rotational direction R2 in the state where the shaft 18 is placed in the initial rotational position upon the rotation of the shaft 18 driven by the electric motor 161 in the first rotational direction R1. Specifically, the first torsion spring 28 is arranged such that the first torsion spring 28 is twisted in the first rotational direction R1 in the initial rotational position. Therefore, in the state where the shaft 18 is in the initial rotational position, a force Ft of the first torsion spring 28 is exerted in the opposite direction that is opposite to the first rotational direction R1, so that the shaft 18 is urged relative to the housing 12 in the second rotational direction R2.

Figure 19:
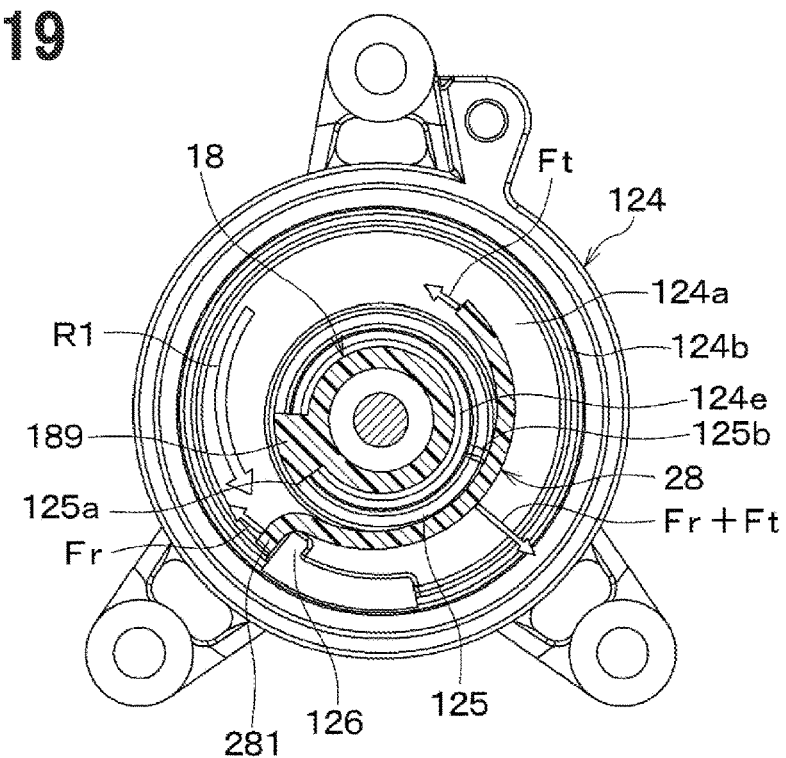
FIG. 19 is an explanatory diagram for explaining a positional relationship between the first torsion spring and a spring guide.

Here, as shown in FIG. 19, a winding direction of the first torsion spring 28 is set in the first rotational direction R1 from the first hook 281 which serves as a winding start point. A reaction force Fr is exerted to the first hook 281 in the second rotational direction R2. Furthermore, a force Ft is exerted in the first rotational direction R1 at a location of the first torsion spring 28, which is on an opposite side of the central axis CL that is opposite to the first hook 281. Therefore, the first torsion spring 28 tends to be displaced such that a portion of the first torsion spring 28, which is circumferentially displaced from the first hook 281 by about 90° in the first rotational direction R1, approaches the central axis CL. In order to hold the first torsion spring 28 in the proper position, the spring guide 125 needs to be formed at least along a range that extends from the first hook 281 to a position circumferentially displaced from the first hook 281 by 90° in the first rotational direction R1.

Figure 20:
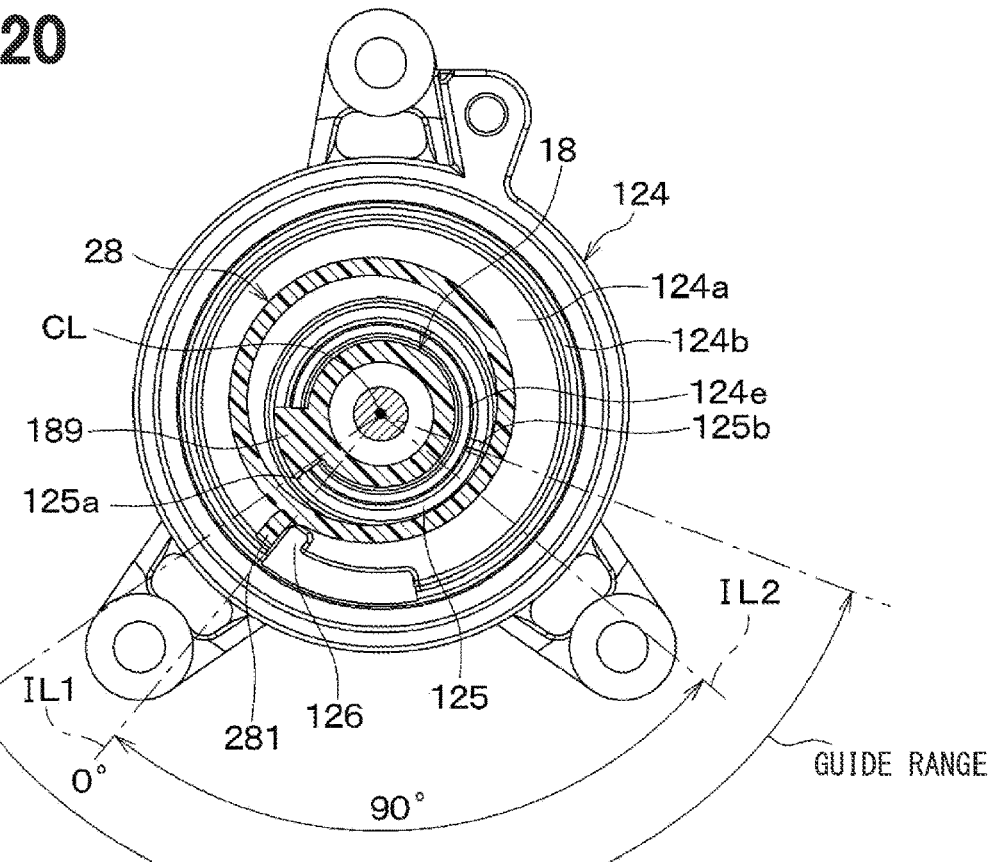
FIG. 20 is an explanatory diagram for explaining a positional relationship between the spring guide and a hook anchoring portion.

Taking this into account, in the valve device 10, as shown in FIG. 20, the spring guide 125 is formed at least along the range that extends from the first hook 281 to the position circumferentially displaced from the first hook 281 by 90° in the first rotational direction R1. A line, which connects between the central axis CL and the main body-side anchoring portion 126, is defined as a first imaginary line IL1. Furthermore, a line, which connects between the central axis CL and the position circumferentially displaced from the main body-side anchoring portion 126 by 90° in a torsional direction of the first torsion spring 28 in the circumferential direction DRc, is defined as a second imaginary line IL2. At this time, the spring guide 125 is formed at least along the range which extends from the first imaginary line IL1 to the second imaginary line IL2. In other words, the spring guide 125 is located at least in a range which is defined by the first torsion spring 28, the first imaginary line IL1 and the second imaginary line IL2. Specifically, the spring guide 125 has the first stopper 125a placed at a position that is rotated, i.e., is circumferentially displaced from the first imaginary line IL1 by a predetermined angle (e.g., 10 to 30 degrees) in the second rotational direction R2. Furthermore, the spring guide 125 has the second stopper 125b placed at a position that is rotated, i.e., is circumferentially displaced by the predetermined angle (e.g., 10 to 30 degrees) from the second imaginary line IL2 in the first rotational direction R1. The predetermined angle described above is an example and is not limited to the above-described angle.

Furthermore, in the valve device 10, the shaft 18 is rotatable in a range where the spring guide 125 is not formed. Thereby, the rotational drive range of the shaft 18 is ensured.

Furthermore, in the valve device 10, the main body-side anchoring portion 126 is placed only at one location at the housing 12. The main body-side anchoring portion 126 is formed at an inner periphery of the rib portion 124b. The main body-side anchoring portion 126 projects toward the central axis CL such that a distance between the central axis CL and the main body-side anchoring portion 126 is reduced in comparison to a distance from a distal end of the first hook 281 to the central axis CL. A distance between the central axis CL and the other portion of the inner periphery of the rib portion 124b, which is other than the main body-side anchoring portion 126, is generally the same as the distance from the distal end of the first hook 281 to the central axis CL. Therefore, when the first torsion spring 28 is assembled to the main-body cover 124, the first hook 281 of the first torsion spring 28 is not anchored to the other portion which is other than the main body-side anchoring portion 126.

The second torsion spring 30 is a spring that urges the lever 24 relative to the shaft 18 in the circumferential direction DRc. The second torsion spring 30 is placed between the shaft 18 and the lever 24. A dimension of the second torsion spring 30 in the axial direction DRa and a dimension of the second torsion spring 30 in the radial direction DRr are smaller than those of the first torsion spring 28.

The second torsion spring 30 has the two hooks 301, 302 which are located at two opposite ends, respectively, of the second torsion spring 30 in the axial direction DRa and outwardly project in the radial direction DRr. For convenience of explanation, hereinafter, the hook 301, which is located on the one side in the axial direction DRa, will be referred to as a third hook 301, and the hook 302, which is located on the other side in the axial direction DRa, will be referred to as a fourth hook 302.

Figure 8:
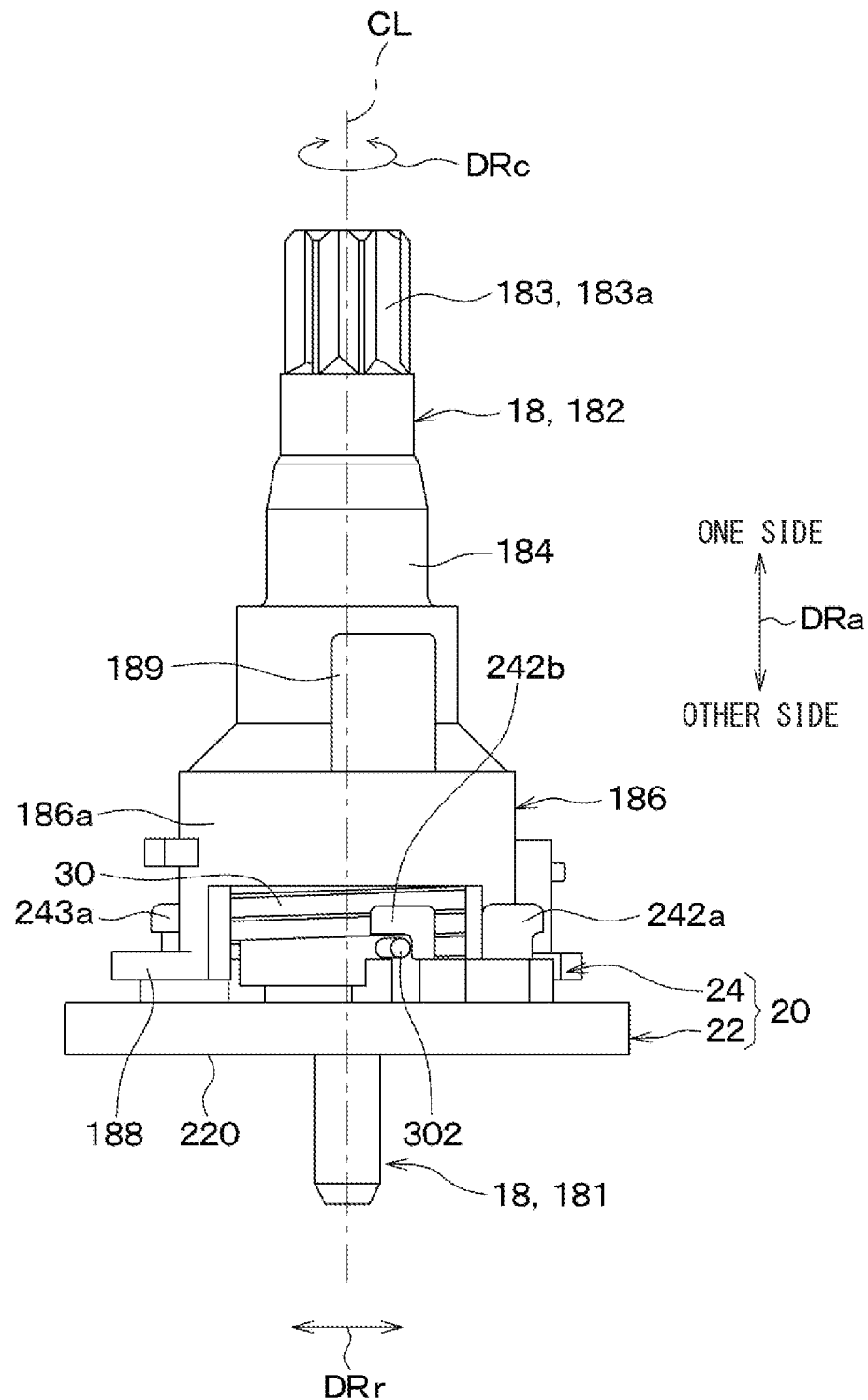
FIG. 8 is a perspective view of the assembly of the shaft, the rotor and the lever viewed in a direction of an arrow VIII in FIG. 7.

As shown in FIG. 9, the third hook 301 of the second torsion spring 30 is anchored to the second large diameter anchoring portion 186c of the holder 182. Furthermore, as shown in FIG. 8, the fourth hook 302 is anchored to the second engaging claw 242b of the lever 24.

The second torsion spring 30 is basically used in a state where the second torsion spring 30 is twisted and resiliently deformed in the circumferential direction DRc. The urging force of the second torsion spring 30 is exerted to the lever 24 at the time of rotating the shaft 18 and at the time of stopping the rotation of the shaft 18. The urging force of the second torsion spring 30 is transmitted as a rotational force to the drive disk 22 through the lever 24. Therefore, by placing the second torsion spring 30 between the shaft 18 and the lever 24, rattling in the circumferential direction DRc between the shaft 18 and the lever 24 is limited. Since the lever 24 is fixed to the drive disk 22, the second torsion spring 30 limits rattling in the circumferential direction DRc in the transmission path that is from the shaft 18 to the drive disk 22. It should be noted that the second torsion spring 30 is only twisted in the circumferential direction DRc and is not compressed in the axial direction DRa.

In the valve device 10, by engaging each flange portion 187, 188 of the shaft 18 with the lever 24 in the state where the second torsion spring 30 is interposed between the shaft 18 and the lever 24, these three components are assembled together as a sub-assembly.

The drive device 16 is a device for outputting the rotational force. As shown in FIG. 3, the drive device 16 includes: the electric motor 161 which serves as a drive power source; and the gear arrangement 162 which serves as a drive force transmission member and transmits the output of the electric motor 161 to the shaft 18.

The electric motor 161 is configured to drive the shaft 18 in the rotational drive range, which is between the initial rotational position and the maximum rotational position, in the first rotational direction R1 toward the initial rotational position and the second rotational direction R2 opposite to the first rotational direction R1. The electric motor 161 is formed by a stepping motor. The electric motor 161 is rotated according to a control signal outputted from the motor controller unit 163 that is electrically connected to the electric motor 161.

Figure 21:
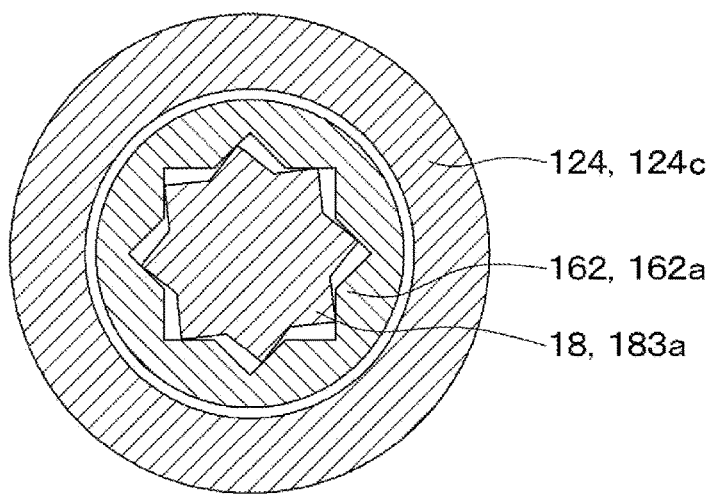
FIG. 21 is a cross-sectional view taken along line XXI-XXI in FIG. 3.

The gear arrangement 162 is a speed reducer that is configured to reduce the rotational speed of the rotation outputted from the electric motor 161. The gear arrangement 162 is formed by a gear mechanism that includes an output gear 162a. As shown in FIG. 21, the output gear 162a is formed by an internal gear meshed with the shaft gear 183a. A backlash is provided between the output gear 162a and the shaft gear 183a to avoid locking of the output gear 162a and the shaft gear 183a. The backlash is a gap formed between a pitch circle of the output gear 162a and a pitch circle of the shaft gear 183a.

The motor controller unit 163 is a computer that includes: a memory, which is a non-transitory tangible storage medium; and a processor. The motor controller unit 163 executes a computer program stored in the memory and performs various control processes according to the computer program.

Figure 22:
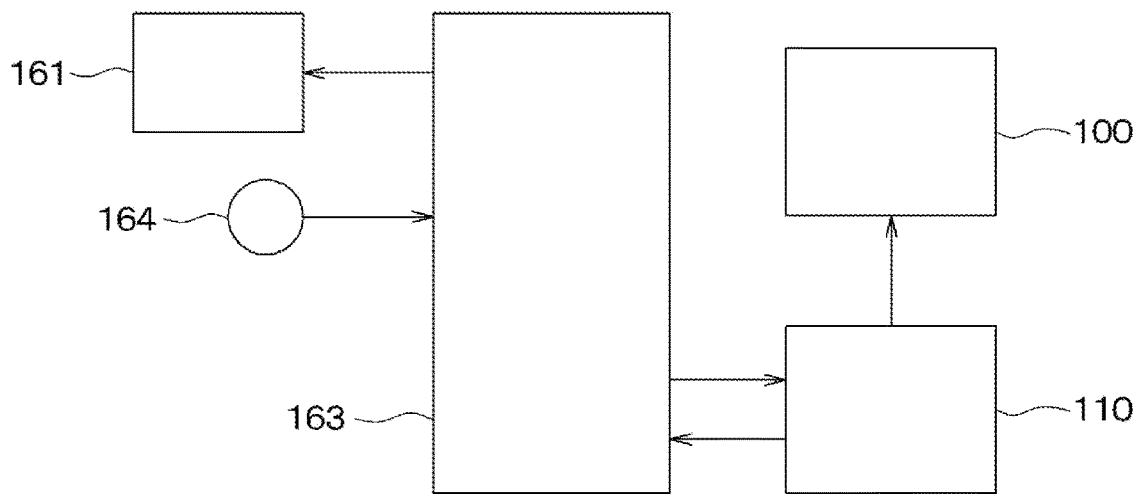
FIG. 22 is a block diagram of a motor controller unit of the valve device.

As shown in FIG. 22, an electromotive force measuring device 164 and a temperature controller unit 110 for controlling the temperature adjusting device 100 are connected to an input side of the motor controller unit 163. The electromotive force measuring device 164 is a measuring device for measuring a counter-electromotive force generated in the coil of the electric motor 161.

When the shaft 18 is rotated by the electric motor 161 to the initial rotational position, the shaft 18 contacts, more specifically collides the first stopper 125a. Thereby, the electric motor 161 is likely placed in a step-out state. When the electric motor 161 is in the step-out state, the counter-electromotive force generated in the coil of the electric motor 161 fluctuates.

In view of the above phenomenon, the motor controller unit 163 determines whether the shaft 18 is in a contact state where the shaft 18 contacts the first stopper 125a upon the rotation of the shaft 18 to the initial rotational position. Specifically, based on the counter-electromotive force, which is measured with the electromotive force measuring device 164 at the time of rotating the shaft 18 in the first rotational direction R1, the motor controller unit 163 determines whether the shaft 18 is in the contact state, in which the shaft 18 contacts the first stopper 125a upon the rotation of the shaft 18 to the initial rotational position.

The motor controller unit 163 controls the electric motor 161 according to, for example, a request from the temperature controller unit 110. The motor controller unit 163 controls the electric motor 161 while keeping track of the position of the shaft 18 with reference to an origin position of the shaft 18. The motor controller unit 163 of the present embodiment executes an initializing process for updating the origin position of the shaft 18 in the contact state where the shaft 18 contacts the first stopper 125a upon the rotation of the shaft 18 to the initial rotational position. The updating of the origin position involves learning of the origin position by matching the position information of the shaft 18 obtained by the motor controller unit 163 with the actual position of the shaft 18. Details of the initializing process will be described later.

Next, an operation of the valve device 10 of the present embodiment will be described. In the valve device 10, as shown in FIGS. 1, 2 and 3, the fluid flows from the inlet 12a into the inlet-side space 12d, as indicated by an arrow Fi. In a case where the first passage hole 141 is opened, the fluid flows from the inlet-side space 12d into the first outlet-side space through the first passage hole 141. The fluid, which is supplied into the first outlet-side space, flows from the first outlet-side space to the outside of the valve device 10 through the first outlet 12b, as indicated by an arrow F1o. In this case, the flow rate of the fluid, which passes through the first passage hole 141, is determined according to the opening degree of the first passage hole 141. That is, the flow rate of the fluid, which flows from the inlet 12a to the first outlet 12b through the first passage hole 141, is increased when the opening degree of the first passage hole 141 is increased.

In contrast, in another case where the second passage hole 142 is opened, the fluid flows from the inlet-side space 12d to the second outlet-side space through the second passage hole 142. The fluid, which is supplied into the second outlet-side space, flows from the second outlet-side space to the outside of the valve device 10 through the second outlet 12c, as indicated by an arrow F2o. In this case, the flow rate of the fluid, which passes through the second passage hole 142, is determined according to the opening degree of the second passage hole 142. That is, the flow rate of the fluid, which flows from the inlet 12a to the second outlet 12c through the second passage hole 142, is increased when the opening degree of the second passage hole 142 is increased.

Here, the valve device 10 adjusts the flow rate of the fluid passing through the valve device 10 to the desired flow rate by adjusting the opening degree of each of the passage holes 141, 142 by adjusting the position of the shaft 18 through the electric motor 161. In order to accurately obtain the desired flow rate in this type of valve device 10, it is important to improve the learning accuracy of the origin position of the shaft 18.

Therefore, in the valve device 10 of the present embodiment, the motor controller unit 163 periodically or non-periodically executes the initializing process for updating the origin position of the shaft 18. The initializing process will be described with reference to FIG. 23.

Figure 23:
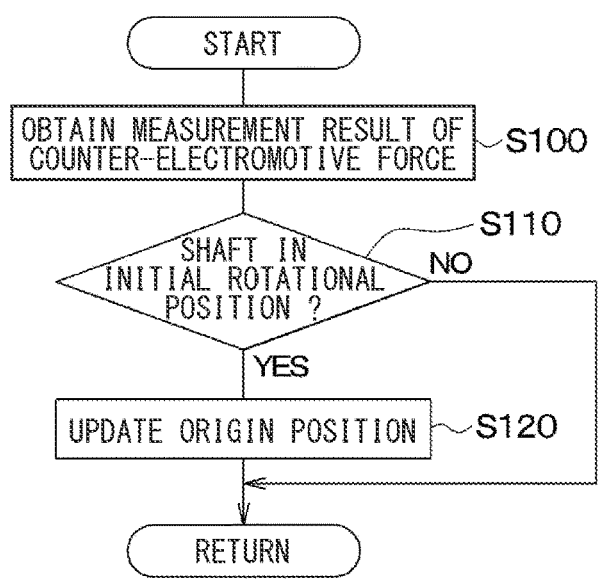
FIG. 23 is a flowchart showing a flow of an initializing process executed by the motor controller unit.

As shown in FIG. 23, at step S100, the motor controller unit 163 obtains a measurement result of the counter-electromotive force generated in the coil of the electric motor 161 from the electromotive force measuring device 164. Then, at step S110, the motor controller unit 163 determines whether the shaft 18 is in the initial rotational position based on the measurement result of the counter-electromotive force. That is, based on the counter-electromotive force generated in the coil of the electric motor 161, the motor controller unit 163 determines whether the shaft 18 is in the contact state, in which the shaft 18 contacts the first stopper 125a upon the rotation of the shaft 18 to the initial rotational position.

When it is determined that the shaft 18 is not in the initial rotational position according to the result of the determining process at step S110, the motor controller unit 163 terminates this process. In contrast, when it is determined that the shaft 18 is in the initial rotational position, the motor controller unit 163 proceeds to step S120. At step S120, the motor controller unit 163 updates the origin position of the shaft 18. Specifically, the motor controller unit 163 updates the initial rotational position, which is the current position of the shaft 18, as the origin position.

Therefore, in the state where the shaft 18 is in the initial rotational position, the shaft 18 is urged relative to the housing 12 by the first torsion spring 28 in the second rotational direction R2. This limits variations in the position of the shaft 18 caused by the presence of the backlash, so that the origin position of the shaft 18 can be properly updated by the initializing process described above.

In the valve device 10 described above, in order to implement highly accurate position control of the shaft 18 (i.e., highly accurate control of the opening degree of each of the passage holes 141, 142), it is important to improve the control position accuracy by limiting the rattling in the circumferential direction DRc and the learning accuracy of the origin position of the shaft 18.

In contrast, in the valve device 10, the shaft 18 is urged relative to the housing 12 by the first torsion spring 28 in the circumferential direction DRc. Therefore, the rattling in the circumferential direction DRc between the drive device 16 and the shaft 18 is limited.

Furthermore, in the valve device 10, the lever 24 is urged relative to the shaft 18 by the second torsion spring 30 in the circumferential direction DRc. Therefore, the rattling in the circumferential direction DRc between the shaft 18 and the lever 24 is limited. Since the lever 24 is fixed to the drive disk 22, the second torsion spring 30 limits the rattling in the circumferential direction DRc between the shaft 18 and the drive disk 22.

Therefore, the rattling in the circumferential direction DRc in the transmission path from the drive device 16 to the rotor 20 can be limited, and thereby the variations in the opening degrees of the passage holes 141, 142 caused by the rattling can be limited.

Furthermore, in the valve device 10, the shaft 18 is urged relative to the housing 12 in the second rotational direction R2 in the state where the shaft 18 is in the initial rotational position. With this configuration, it is possible to carry out the highly accurate position control of the shaft 18 (i.e., opening degree control of each of the passage holes 141, 142) while using the initial rotational position as the start point of this position control of the shaft 18.

In addition, unintended deflection of the housing 12 and the shaft 18 can be limited when the shaft 18 collides the stopper 125a, 125b. This allows for highly accurate positioning at the time of learning the origin position of the shaft 18 in the contact state of the shaft 18, in which the shaft 18 contacts the first stopper 125a, so that the learning accuracy of the origin position of the shaft 18 can be improved. Thus, the flow rate of the fluid passing through the valve device 10 of the present embodiment can be appropriately adjusted while limiting variations in the opening degree of the respective passage holes 141, 142.

In addition, the drive disk 22 is coupled to the shaft 18 in the state where the drive disk 22 is displaceable in the axial direction DRa. Therefore, even when the second torsion spring 30 is placed between the shaft 18 and the lever 24, the surface-to-surface contact between the sliding surface 220 of the drive disk 22 and the stationary disk 14 can be maintained satisfactorily.

Here, in the case where a single torsion spring is used to limit the rattling in the circumferential direction DRc in the transmission path from the drive device 16 to the rotor 20, the urging force of the torsion spring becomes excessively large, and thereby an increase in the load on the drive device 16 is unavoidable.

In contrast, when the structure is configured to limit the rattling in the circumferential direction DRc in the transmission path from the drive device 16 to the rotor 20 by the first torsion spring 28 and the second torsion spring 30, the urging force of the respective torsion springs 28, 30 can be limited. Therefore, an increase in the load of the drive device 16 can be limited.

Furthermore, the valve device 10 of the present embodiment can achieve the following advantages.

(1) The drive device 16 includes the motor controller unit 163 that controls the electric motor 161 while keeping track of the position of the shaft 18 with reference to the origin position of the shaft 18. The motor controller unit 163 executes the initializing process for updating the origin position of the shaft 18 in the contact state where the shaft 18 contacts the first stopper 125a upon the rotation of the shaft 18 to the initial rotational position. With this configuration, it is possible to carry out the highly accurate position control of the shaft 18 while using the initial rotational position as the start point of this position control of the shaft 18.

(2) Specifically, the electric motor 161 is formed by the stepping motor. The motor controller unit 163 determines whether the shaft 18 is in the contact state, in which the shaft 18 contacts the first stopper 125a, based on the counter-electromotive force generated in the coil of the electric motor 161. Thus, when the stepping motor with excellent positional accuracy is employed, it is possible to carry out the highly accurate position control of the shaft 18 (i.e., opening degree control of each of the passage holes 141, 142) while using the initial rotational position as the start point of this position control of the shaft 18.

(3) The shaft 18 includes: the shaft core 181 that is made of the metal and includes the central axis CL while the shaft core 181 extends in the axial direction DRa; and the holder 182 that is made of the resin and is coupled to the shaft core 181. The holder 182 is configured to receive the urging force of the first torsion spring 28 and the urging force of the second torsion spring 30. According to this configuration, the rigidity and accuracy (that is, straightness) of the shaft 18 can be ensured as compared with the case where the entire shaft 18 is made of a resin material. Moreover, when the holder 182 is made of the resin, it is possible to realize the shaft 18 that is lightweight and has a complex shape. In particular, by ensuring the straightness of the shaft 18, a clearance of, for example, the bearing 124g can be reduced. Therefore, a positional deviation of the shaft 18 in the radial direction (i.e., the radial direction DRr) of the shaft 18 can be limited.

(4) The shaft 18 extends through the stationary disk 14 and the drive disk 22 and is rotatably supported by the housing 12. By adopting the structure in which the shaft 18 extends through the stationary disk 14 and the drive disk 22, the stationary disk 14 and the drive disk 22 can be centered by the shaft 18. As a result, the positional deviation of the stationary disk 14 and the drive disk 22 in the radial direction can be limited. This is effective for limiting the variations in the opening degree of the respective passage holes 141, 142.

(5) Furthermore, each of the stoppers 125a, 125b is located at the inside of the first torsion spring 28. Therefore, unintended deflection of the housing 12 and the shaft 18 can be limited when the shaft 18 collides the stopper 125a, 125b. This allows for highly accurate positioning at the time of learning the origin position of the shaft 18 in the contact state of the shaft 18, in which the shaft 18 contacts the first stopper 125a, so that the learning accuracy of the origin position of the shaft 18 can be improved. That is, the unintended deflection of the housing 12 and the shaft 18 can be limited when the shaft 18 collides the first stopper 125a. Therefore, it is possible to limit variations in the opening degree of each of the passage holes 141, 142 caused by the unintended deflection of, for example, the shaft 18.

(6) The housing 12 has the spring guide 125 that is placed at the inside of the first torsion spring 28 and is circumferentially arranged around the central axis CL, and the stoppers 125a, 125b are respectively formed at the two opposite end portions of the spring guide 125, which are opposed to each other in the circumferential direction DRc. When the structure is formed such that the rotational drive range of the shaft 18 is limited by the end portions of the spring guide 125, which are opposite to each other in the circumferential direction DRc, the structure can be simplified in comparison to a structure where the spring guide 125 is formed separately from the stoppers 125a, 125b. This contributes to a reduction in the size of the valve device 10.

(7) The spring guide 125 is formed at least along the range which extends from the first imaginary line IL1 to the second imaginary line IL2. When the spring guide 125 is placed at the range where the first torsion spring 28 tends to be displaced to approach the central axis CL, the first torsion spring 28 can be limited at the proper position by the spring guide 125.

Furthermore, in the case where the spring guide 125 is placed in the required minimum range, the rotational drive range of the shaft 18 can be increased while limiting the first torsion spring 28 at the proper position. In this case, a degree of freedom with respect to a valve opening degree instruction is increased, and a value of the valve device 10 can be improved.

(8) The housing 12 has the main body-side anchoring portion 126, to which the first hook 281 of the first torsion spring 28 is anchored, and the main body-side anchoring portion 126 is placed only at the one location in the circumferential direction DRc. With this configuration, since there is only one location, at which the first hook 281 can be anchored, in the housing 12, it is possible to limit erroneous assembly of the first torsion spring 28 that causes the anchoring of the first hook 281 at an unintended location.

(9) The rotational drive range of the shaft 18 in the circumferential direction includes: the urging range in which the first torsion spring 28 urges the shaft 18 in the circumferential direction DRc; and the non-urging range in which the first torsion spring 28 does not urge the shaft 18 in the circumferential direction DRc. According to this, for example, at the time of assembling the first torsion spring 28 to the housing 12 and the shaft 18, it is not necessary to assemble the first torsion spring 28 in the twisted state by setting the rotational position of the shaft 18 to the non-urging range. By rotating the shaft 18 to some extent after assembling the first torsion spring 28, the torsional resilient deformation of the first torsion spring 28 can be obtained.

OTHER EMBODIMENTS

Although the representative embodiment of the present disclosure has been described above, the present disclosure is not limited to the above-described embodiment. The components of the valve device 10 are not limited to the above-described components and may be different from the above-described components.

The initializing process may be executed in, for example, the state where the shaft 18 is rotated to the maximum rotational position and contacts the second stopper 125b. Furthermore, the electric motor 161 may be formed by, for example, a servomotor. It may also be possible to determine whether the shaft 18 is in the contact state, in which the shaft 18 contacts the first stopper 125*a*, based on an output of a position sensor that is configured to sense the rotational position of the electric motor 161.

As described in the above embodiment, it is desirable that the shaft 18 includes the shaft core 181 made of the metal and the holder 182 made of the resin. However, the present disclosure is not limited to this. For example, the shaft 18 may be formed such that the shaft core 181 and the holder 182 are made of one of the metal material and the resin material.

In the above-described embodiment, there is exemplified that the two end portions of the shaft 18 are rotatably supported by the housing 12. However, the valve device 10 is not limited to this. In the valve device 10, for example, one end portion of the shaft 18 may be rotatably supported by the stationary disk 14. Furthermore, in the valve device 10, for example, only one of the two end portions of the shaft 18 may be rotatably supported by the housing 12.

As in the embodiment described above, it is desirable that each of the stoppers 125*a*, 125*b* is placed at the inside of the first torsion spring 28. However, each of the stoppers 125*a*, 125*b* may be placed at the outside of the first torsion spring 28.

As in the embodiment described above, it is desirable that the stoppers 125*a*, 125*b* are respectively formed at the two opposite end portions of the spring guide 125, which are opposite to each other in the circumferential direction DRc. However, the present disclosure is not limited to this configuration. For example, the stoppers 125*a*, 125*b* may be formed separately from the spring guide 125. In such a case, the spring guide 125 is not essential and may be eliminated.

As in the embodiment described above, it is desirable that the housing 12 has the portion, to which the first hook 281 can be anchored, and this portion is provided only at the one location in the housing 12. However, the present disclosure is not limited to this configuration, and the housing 12 may have a plurality of portions, to each of which the first hook 281 can be anchored.

In the above-described embodiment, the compression spring 26 urges the rotor 20 against the stationary disk 14. However, the valve device 10 of the present disclosure is not limited to this configuration. The valve device 10 may be configured such that, for example, an elastomer, which is shaped in a cylindrical tubular form and is resiliently deformable in the axial direction DRa of the shaft 18, may be used to urge the rotor 20 against the stationary disk 14. Furthermore, the valve device 10 may be configured such that a pressure difference between the inlet-side space 12*d* and the outlet-side space 12*e* is used to urge the rotor 20 against the stationary disk 14. As indicated above, the compression spring 26 is not an essential component in the valve device 10.

As described in the above embodiment, it is desirable that in the valve device 10, the rotatable range of the shaft 18 includes the non-urging range. However, the present disclosure is not limited to this. In the valve device 10, the rotational drive range of the shaft 18 does not have to include the non-urging range.

As described in the above embodiment, it is desirable that in the valve device 10, the lever 24 includes the engaging portion which is configured to engage with the shaft 18 in the state where the second torsion spring 30 is interposed between the engaging portion and the shaft 18. However, this engaging portion may be eliminated.

In the above-described embodiment, there is exemplified that the valve device 10 is formed as the three-way valve. However, the valve device 10 is not limited to the three-way valve. The valve device 10 of the present disclosure may be configured as, for example, a flow rate adjusting valve or an on-off valve which has one fluid inlet and one fluid outlet. In this case, one flow passage hole is formed at the stationary disk 14. The valve device 10 of the present disclosure may be, for example: a multi-way valve having one fluid inlet and three or more fluid outlets; a multi-way valve having three or more fluid inlets and one fluid outlet; or a multi-way valve having a plurality of fluid inlets and a plurality of fluid outlets.

In the above-described embodiment, there is described the example where the valve device 10 of the present disclosure is applied as the control valve for the vehicle. However, the valve device 10 of the present disclosure may be applied as a control valve for other machines that is other than the vehicle.

Needless to say, in the above-described embodiment, the components of the embodiment(s) are not necessarily essential except when it is clearly indicated that they are essential and when they are clearly considered to be essential in principle.

In the above-described embodiment, when the numerical values, such as the number, numerical value, quantity, range, etc. of the components of the embodiment(s) are mentioned, the numerical values are not limited to those described in the embodiment(s) except when it is clearly indicated that the numeric values are essential and when the numeric values are clearly considered to be essential in principle.

In the above-described embodiment, when a shape, a positional relationship, etc. of the component(s) is mentioned, the shape, positional relationship, etc. are not limited to those described in the embodiment(s) unless otherwise specified or limited in principle to the those described in the embodiment(s).

The controller unit and its method of the present disclosure may be realized by a dedicated computer that is provided by configuring at least one processor and a memory programmed to perform one or more functions embodied by a computer program. The controller unit and its method of the present disclosure may be realized by a dedicated computer that is provided by configuring at least one processor with one or more dedicated hardware logic circuits. The control unit and its method of the present disclosure may be realized by one or more dedicated computers that are provided by configuring a combination of (A) a processor and a memory programmed to perform one or more functions and (B) a processor composed of one or more hardware logic circuits. Further, the computer program may also be stored in a computer-readable, non-transitory, tangible storage medium as instructions to be executed by a computer.

What is claimed is:

1. A valve device comprising:
 a housing that forms a fluid passage at an inside of the housing, wherein the fluid passage is configured to conduct a fluid through the fluid passage;
 a stationary disk that is shaped in a plate form and is fixed at the inside of the housing, wherein the stationary disk has at least one flow passage hole which is configured to conduct the fluid through the at least one flow passage hole;
 a drive device that is configured to output a rotational force;
 a shaft that is configured to be rotated about a central axis, which is predetermined, by the rotational force; and a rotor that is configured to increase or decrease an opening degree of the at least one flow passage hole in response to rotation of the shaft, wherein:

the rotor includes:
- a drive disk that is shaped in a plate form and is configured to slide relative to the stationary disk in a state where the drive disk is opposed to the stationary disk; and
- a lever that is fixed to the drive disk and couples between the drive disk and the shaft to enable integral rotation of the drive disk and the shaft in a state where the drive disk is displaceable in an axial direction of the shaft;

a first torsion spring is placed between the housing and the shaft and is configured to urge the shaft relative to the housing in a circumferential direction around the central axis of the shaft;

a second torsion spring is placed between the shaft and the lever and is configured to urge the lever relative to the shaft in the circumferential direction;

the drive device includes an electric motor that is configured to drive the shaft in a rotational drive range, which is between an initial rotational position and a maximum rotational position, in a first rotational direction toward the initial rotational position and a second rotational direction opposite to the first rotational direction; and in a state where the shaft is in the initial rotational position after the shaft is driven by the electric motor in the first rotational direction, the first torsion spring urges the shaft relative to the housing in the second rotational direction.

2. The valve device according to claim 1, comprising a motor controller unit that is configured to control the electric motor while keeping track of a position of the shaft with reference to an origin position of the shaft, wherein:
- the initial rotational position is a position of the shaft at which rotation of the shaft is limited by contact of the shaft with a stopper of the housing; and
- the motor controller unit is configured to execute an initializing process that updates the origin position of the shaft in a contact state where the shaft contacts the stopper upon rotation of the shaft to the initial rotational position.

3. The valve device according to claim 2, wherein:
- the electric motor is a stepping motor; and
- the motor controller unit is configured to determine whether the shaft is in the contact state, in which the shaft contacts the stopper, based on a counter-electromotive force generated in a coil of the electric motor.

4. The valve device according to claim 1, wherein the shaft includes:
- a shaft core that is made of metal and includes the central axis while the shaft core extends in the axial direction; and
- a holder that is made of resin and is coupled to the shaft core, wherein the holder is configured to receive an urging force of the first torsion spring and an urging force of the second torsion spring.

5. The valve device according to claim 1, wherein the shaft extends through the stationary disk and the drive disk and is rotatably supported by the housing.

* * * * *